US006979976B2

(12) United States Patent
Tachibana

(10) Patent No.: US 6,979,976 B2
(45) Date of Patent: Dec. 27, 2005

(54) DRIVING APPARATUS FOR DRIVING A BRUSHLESS MOTOR

(75) Inventor: Toshiyuki Tachibana, Himeji (JP)

(73) Assignee: Itoh Denki Co., Ltd., (JP)

( * ) Notice: Subject to any disclaimer, the term of this patent is extended or adjusted under 35 U.S.C. 154(b) by 0 days.

(21) Appl. No.: 10/885,835

(22) Filed: Jul. 7, 2004

(65) Prior Publication Data
US 2005/0024010 A1   Feb. 3, 2005

(30) Foreign Application Priority Data
Jul. 31, 2003   (JP) .............................. 2003-284524

(51) Int. Cl.[7] .............................................. H02P 6/24
(52) U.S. Cl. ...................... 318/801; 318/254; 318/138; 318/439; 318/269; 318/273; 318/275; 318/362
(58) Field of Search ............................... 318/254, 138, 318/439, 801, 269, 273, 275, 362

(56) References Cited

U.S. PATENT DOCUMENTS

| | | | | |
|---|---|---|---|---|
| 3,940,670 A | * | 2/1976 | Tanikoshi | ................... 318/254 |
| 4,396,876 A | * | 8/1983 | Tojiki et al. | ................. 318/255 |
| 4,423,363 A | * | 12/1983 | Clark et al. | .................. 318/375 |
| 5,254,915 A | * | 10/1993 | Komatsu et al. | ............ 318/369 |
| 6,459,224 B2 | * | 10/2002 | Itoh et al. | .................... 318/445 |

* cited by examiner

Primary Examiner—Rita Leykin
(74) Attorney, Agent, or Firm—Wood, Phillips, Katz, Clark & Mortimer

(57) ABSTRACT

A driving system for driving a brushless motor effects a rotation control of a rotor by sequentially switching application of a current to magnetic coils disposed in a stator in response to a detection signal from a pole-position detector. The driving system comprises a controlling circuit for generating a driving signal, an inverter control circuit for controlling application of the current to the coils by adjusting opening and closing of switching devices in response to the driving signal, and a rotational speed sensor. The controlling circuit generates a braking signal when a rotational speed of the rotor is beyond a predetermined value, and transmits the braking signal to the inverter control circuit. The inverter control circuit effects a braking control in response to the braking signal by application of the current to at least one coil except those coils being excited upon reception of the braking signal.

19 Claims, 16 Drawing Sheets

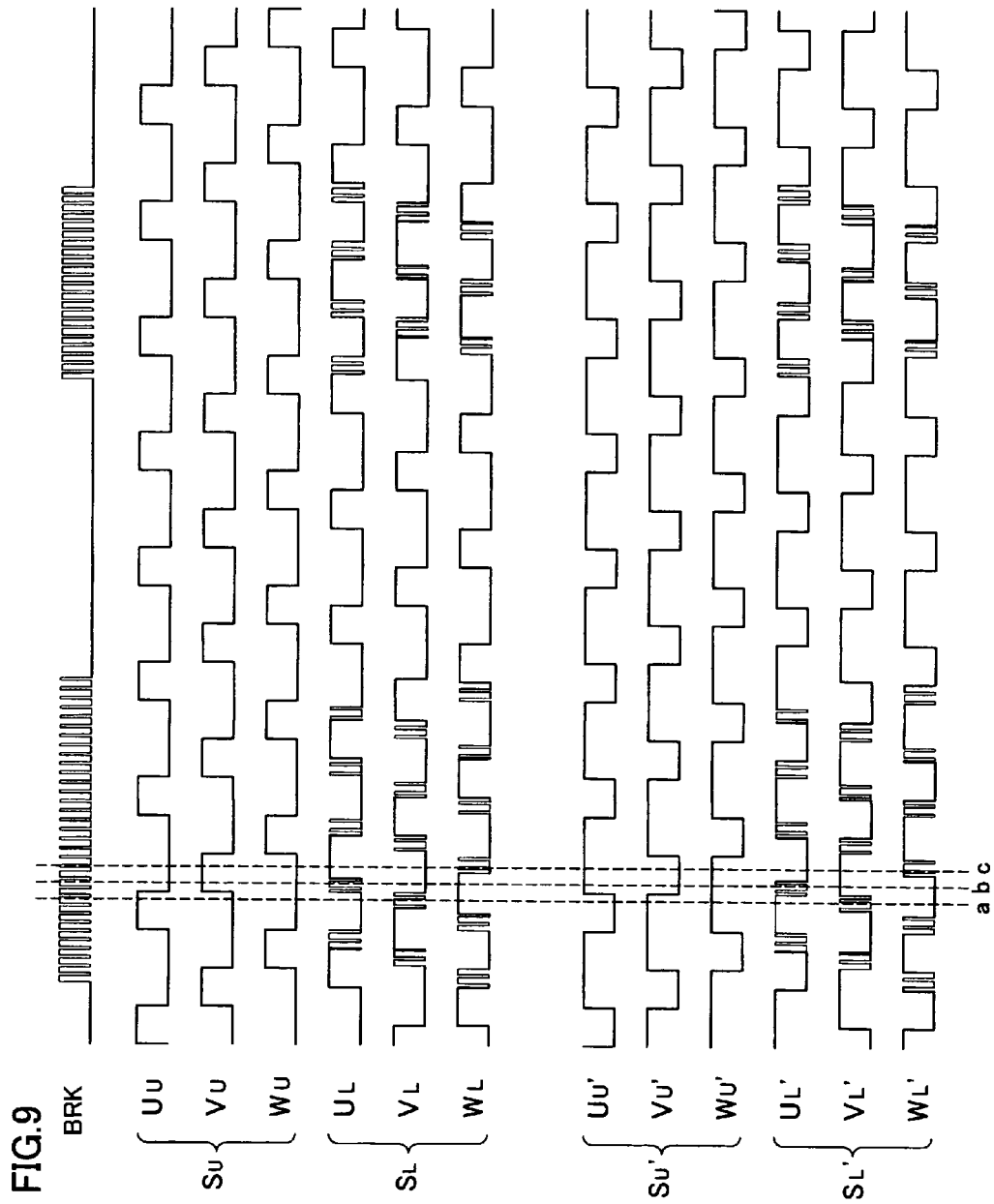

DRIVING APPARATUS FOR DRIVING A BRUSHLESS MOTOR

BACKGROUND OF THE INVENTION

1. Field of the Invention

The present invention relates to an improvement of a driving apparatus for driving a brushless motor, and more particularly to the driving apparatus for driving the brushless motor that provides a stable rotational speed by a smooth braking.

2. Description of the Related Art

Recently, a brushless motor is becoming increasingly common in place of a DC motor with a brush. The brushless motor comprises a commutation system that electromagnetically detects a rotation of a rotor and switches application of a current to magnetic coils, instead of a mechanical commutation system that comprises a mechanical brush and a commutator. Thus, the brushless motor, compared with the motor provided with the mechanical commutation system, has advantages of a reduction of a noise resulting from the rotation and a high durability.

The brushless motor is employed as a driving source for various kinds of apparatus such as conveyor lines.

In the conveyor lines incorporating the brushless motor, not only a flat conveyor line but also an inclined line is formed. However, in the inclined conveyor line, specifically in a line having a descent inclination, a conveying speed of an article is increased by a force of gravity at the descent inclination part, resulting in increasing the brushless motor's rotational speed along with the increase of the speed of the articles. It has caused problems such as an increase of an impact when making the accelerated articles to stop, and/or an increase of an inertia resulting from the increase of the conveying speed, thereby making a stop position unstable.

In order to prevent the brushless motor from the increase of the rotational speed resulting from such an external force on the motor, several means for a braking control so as to reduce the rotational speed are previously suggested. For example, a patent document specified below discloses a construction that effects a braking by reversing a rotational direction with maintaining application of a current to the brushless motor.

Patent Document: Japanese Patent Laying-Open Gazette No 06-276785.

However, the braking control disclosed in the patent document requires application of a large excitation current so as to reverse the rotational direction, and causes a remarkable increase of the electrical current. Further, on starting the braking control, an abrupt braking force acts against the rotation at that time, resulting in a vibration and an impact, which generates noise, so that the improvement has been expected.

SUMMARY OF THE INVENTION

An object of the present invention made in view of the problems and drawbacks described above is therefore to provide an advanced driving apparatus for driving a brushless motor enabling a rotational speed to be stabilized and to be reduced remarkably readily by a smooth braking with restraining an increase of the applied current.

In order to achieve this object, an aspect of the present invention provided herein is a driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising a pole-position detector for detecting a position of a magnetic pole and outputting the detection signal, a controlling circuit for generating a driving signal in response to the detection signal from the pole-position detector, an inverter control circuit for controlling application of the current to each of the coils, and a rotational speed sensor for sensing a rotational speed of the rotor, wherein the controlling circuit is adapted to generating a braking signal based on the rotational speed sensed by the rotational speed sensor and transmitting the driving and braking signals to the inverter control circuit, and wherein the inverter control circuit is adapted to effecting the rotation control by sequentially switching application of the current to each of the coils upon reception of the driving signal and effecting the braking control by applying the current to at least one coil except those coils being excited under the rotation control upon reception of a braking signal generated on condition that the rotational speed is beyond a predetermined value. Herein, the term "rotation control" denotes the control for rotating the rotor and the term "braking control" denotes the control for restraining the rotation of the rotor. In one embodiment, a braking signal is generated even when the rotational speed is equal to or below the predetermined value. In another embodiment, a braking signal is not generated when the rotational speed is equal to or below the value.

The driving apparatus of the present aspect, when the rotational speed sensed by the rotational speed sensor is equal to or below the predetermined value, sequentially switches application of the current to each of the coils in response to the driving signal transmitted from the controlling circuit, thereby effecting the normal rotation control.

On the other hand, when the rotational speed is beyond the predetermined value, the controlling circuit transmits the driving signal and a braking signal generated therein to the inverter control circuit. The inverter control circuit sequentially switches application of the current to each of the coils in response to the driving signal transmitted from the controlling circuit, thereby continuing the normal rotation control, and simultaneously applies the current, in response to the braking signal, to at least one coil except those coils being excited in response to the driving signal, thereby making the braking control.

In other words, when the rotational speed of the rotor is beyond the predetermined value, the driving apparatus of the present aspect applies the current to at least one coil except those coils that are sequentially excited by the rotation control. Thus, the rotor of the brushless motor continues to rotate, while receiving the braking force against the rotational force. The controlling circuit stops the braking control when the braking force reduces the rotational speed of the rotor to the predetermined value, and effects the normal rotation control.

Consequently, the present apparatus, compared with the construction in the art that is arranged to effect the braking by applying a large current to the coils for reversing the rotational direction, avoids an abrupt torque change to the rotor. Thereby it enables to avoid the vibration and impact by the braking and to smoothly reduce the speed, and it further minimizes the increase of the power dissipation.

In the present aspect, the coil being excited in response to the braking signal, not having been excited until that time, is capable of generating a braking magnetic field to the rotor. Consequently, the present apparatus, applying the current sequentially to the coils not being excited upon reception of a detection signal from the pole-position detector, and thereby generating the braking magnetic field, effects the braking control with effecting the rotation control.

Further, in the present aspect, it is possible to properly determine the number of the magnetic poles of the rotor, the number of phases of the stator and the number of slots of the coils. In any arrangement, as described above, applying the current sequentially to the coils that have not been excited and that are capable of generating the braking magnetic field achieves the braking control effectively with effecting the rotation control.

In the present aspect, the pole-position detector may be constituted by employing an element such as a Hall effect sensor, which outputs different signals depending on presence or absence of the magnetic pole in the proximity of the sensor. In the present aspect, the rotational speed sensor also may be constituted by a calculation using the detection signal from the pole-position detector.

In order to solve the same problems mentioned above, another aspect of the present invention provided herein is a driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising a pole-position detector for detecting a position of a magnetic pole and outputting the detection signal, a controlling circuit for generating a driving signal in response to the detection signal from the pole-position detector, an inverter control circuit for controlling application of the current to each of the coils, and a rotational speed sensor for sensing a rotational speed of the rotor, wherein each coil has a first and a second ends, the first ends being connected mutually, wherein the controlling circuit is adapted to generating a braking signal based on the rotational speed sensed by the rotational speed sensor and transmitting the driving and braking signals to the inverter control circuit, and wherein the inverter control circuit comprises a first control section for electrically connecting each of the second ends of the coils to a positive power source and a second control section for electrically connecting each of the second ends of the coils to a negative power source, the inverter control circuit being adapted to effecting the rotation control by a) electrically connecting a first coil selected from the coils to the positive power source through the first control section, b) electrically connecting a second coil selected from the coils to the negative power source through the second section and c) sequentially switching selection of the first and second coils, and the inverter control circuit further being adapted to effecting the braking control by electrically connecting a third coil selected from the coils not excited under the rotation control to the negative power source through the second control section so as to discharge part of the current flowing in the first coil by branching off through the third coil on condition of receiving a braking signal outputted on condition that the rotational speed of the rotor is beyond the predetermined speed.

The present apparatus controls the brushless motor that is constructed in such a manner that a plurality of (three or more) coils are connected in Y-type, for example, a three-phase brushless motor having three phases of U, V and W. The apparatus has a characteristic in the inverter control circuit.

Now, the present apparatus will be illustrated in detail below by the case in which the control of the three-phase brushless motor having the three-phase coils of U, V and W is effected. In such a structure, the inverter control circuit, for example, connects electrically the U-phase coil to the positive power source in response to the driving signal and the V-phase coil to the negative power source as well. In such arrangement, the electrical current is applied from the positive power source through the U-phase and the V-phase coils to the negative power source. Therefore, the rotor obtains a rotational force because the U-phase and the V-phase coils are magnetized in the direction determined by the applied current. The present apparatus, sequentially switching the phases of the coils being excited, continuously gives rotational force to the rotor, so as to rotate it.

In the present apparatus, when the detection signal sensed by the rotational speed sensor is beyond the predetermined rotational value, thereby generating the braking signal, a current is applied to the coil except those coils being excited to rotate the rotor, concurrently with the rotational control by the driving signal. More particularly, for example, as the case described above, when the controlling circuit outputs the braking signal while being applying the current to the U-phase and the V-phase coils in response to the driving signal, the inverter control circuit applies the current to the W-phase coil, which is not excited under the driving signal, thereby effecting the braking control. In other words, the present apparatus, when the braking signal is generated, connects electrically the W-phase coil, not having been excited, to the negative power source, in addition to the V-phase coil that has already been connected electrically to the negative power source in response to the driving signal. Such an arrangement converts the state that the current is applied from the positive power source through the U-phase and the V-phase coils to the negative power source in response to the driving signal into the state that the current is applied from the positive power source through the U-phase coil and also through the V-phase and the W-phase coils in parallel to the negative power source in response to the driving and the braking signals. In such a manner, application of the current to the W-phase coil magnetizes the W-phase coil in a particular direction, so as to apply the braking force to the rotor. The present apparatus continuously applies the braking force to the rotor and reduces the speed thereof, by continuing application of the current to the coils, sequentially switching the phases thereof.

As for the present invention, the "positive" and the "negative" power sources represent a relative relationship of the voltage. Therefore, the positive and the negative power source may be replaced with the positive power source and a ground potential, or a ground potential and the negative power source. That is, the positive power source must be only a higher potential than the negative power source.

In order to solve the same problems mentioned above, a still another aspect of the present invention provided herein is a driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising a pole-position detector for detecting a position of a magnetic pole and outputting the detection signal, a controlling circuit for generating a driving signal in response to the detection signal from the pole-position detector, and an inverter control circuit for controlling application of the current to each of the coils, wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal in response to the deviation signal when the rotational speed of the rotor is beyond the standard rotational speed, and is adapted to transmitting both the driving and braking signals to the inverter control circuit, and wherein the inverter control circuit is adapted to effecting the rotation control by sequentially switching application of the current to each of the coils upon reception of the driving signal and effecting the braking control by applying the current to at least one coil except those coils being excited under the rotation control upon reception of a braking signal generated on condition that the rotational speed is beyond a predetermined value.

The present apparatus generates the braking signal in response to the deviation signal that is based on the standard signal generated by the standard signal generator and the detection signal sensed by the rotational speed sensor, thereby effecting the braking control in response to the braking signal. Consequently, the present apparatus permits the rotational speed of the rotor to stabilize by a feedback control braking the rotor by the braking signal until the rotational speed of the rotor corresponds to the standard signal.

In the present apparatus, the standard signal from the standard signal generator and the detection signal sensed by the rotational speed sensor may be represented as voltage signals respectively, and the difference of which may be determined as a deviation voltage at the deviation determiner.

Further, in the present apparatus, the standard signal and the detection signal may be represented in the form of clock pulses and signal pulses, respectively, and a periodic difference (or a frequency difference) of which may be determined as a deviation period (or a deviation frequency) at the deviation determiner.

Still further, in the present apparatus, the rotational speed sensor may employ the pole-position detector as well as the driving apparatus described above.

Here, in the driving apparatus described above, it is possible that the rotational speed sensor is adapted to outputting detection signal pulses of a frequency corresponding to the rotational speed of the rotor, and the controlling circuit comprises a standard signal generator for generating standard clock pulses of a predetermined frequency for specifying a standard rotational speed of the rotor, a deviation determiner for comparing the standard clock pulses and the detection signal pulses so as to output a deviation signal based on one selected from a) the number of the standard clock pulses counted per one period of the detection signal pulse and b) the number of the detection signal pulses counted per one period of the standard clock pulse, and a braking signal generator for generating a braking signal based on the deviation signal.

In the driving apparatus described above, similarly, it is possible that the deviation signal has an output level that depends on one selected from a) the number of the standard clock pulses counted per one period of the detection signal pulse and b) the number of the detection signal pulses counted per one period of the standard clock pulse, and the braking signal is outputted depending on the output level of the deviation signal.

The present apparatus, for example, may be arranged that, assuming the frequency of the standard clock pulses as 1 KHz, when the detection signal pulses become one tenths as many as the frequency of the standard clock pulses, the rotational speed of the rotor corresponds to the standard rotational speed specified by the standard clock pulses. That is, the rotational speed of the rotor may become the specified speed when the detection signal pulses become 100 Hz for 1 kHz of the standard clock pulses.

In such arrangement, while the rotational speed of the rotor is normal, 10 clocks of the standard clock pulses are counted during one period of the detection signal pulses, and along with the increase of the rotational speed of the rotor, the counts decreases such as 9, 8, and so on. Consequently, in this arrangement, it is possible to output the deviation signal in response to the decrease of the counts on condition that the counts of the standard clock pulses are below 10 clocks.

The present apparatus, for example, may also employ such a structure that, assuming the frequency of the standard clock pulses as 100 Hz, when the detection signal pulses become 10 times as many as the frequency of the standard clock pulses, the rotational speed of the rotor corresponds to the standard rotational speed specified by the standard clock pulses. That is, the rotational speed of the rotor may become the specified speed when the detection signal pulses become 1 kHz for 100 Hz of the standard clock pulses.

In such arrangement, while the rotational speed of the rotor is normal, 10 pulses of the detection signal pulses are counted during one period of the standard clock pulses, and along with the increase of the rotational speed of the rotor, the counts increase such as 11, 12, and so on. Consequently, in this arrangement, it is possible to output the deviation signal in response to the increase of the counts on condition that the counts of the standard clock pulses are beyond 10 clocks.

It is preferable that the controlling circuit comprises a standard signal generator for generating a standard signal specifying a standard rotational speed of the rotor, a deviation determiner for outputting a deviation signal based on the standard signal and the detection signal, and a braking signal generator for generating a braking signal that is pulse width modulated in response to the deviation signal when the rotational speed of the rotor is beyond the standard rotational speed.

The present apparatus, for example, may have a structure to modulate pulse width such that the higher level the deviation signal is, the braking signal of the wider pulse (large duty ratio) is outputted and that the lower level the deviation signal is, the braking signal of the narrower pulse (small duty ratio) is outputted. Thus, the present aspect of the invention transmits the braking signal that is pulse width modulated to the inverter control circuit, thereby making an on-off control during the period depending on pulse width, thereby allowing the braking control stable and simplifying the structure of the driving apparatus.

It is preferable that the inverter control circuit comprises a plurality of switching devices for controlling application of a current to each of the coils by adjusting opening and closing of the switching devices.

Further, it is preferable that the inverter control circuit comprises a driving circuit and an inverter circuit, the driving circuit being adapted to processing the driving and braking signals transmitted to the controlling circuit and generating a signal adaptable to the inverter circuit.

The present invention may be used in relation to a motorized roller comprising a fixed shaft, a roller body that is held rotatably relative to the fixed shaft, and a brushless motor accommodated in the roller body so as to rotate the roller body, wherein the brushless motor comprises a stator that is mounted to the fixed shaft and a rotor that is rotatable relative to the fixed shaft, and wherein the rotation control of the rotor is effected by the above-described driving apparatus for driving the brushless motor.

The driving apparatus does not cause an abrupt torque convert to the rotor due to the braking operation. Consequently the present motorized roller causes little vibration and impact resulting from the braking and achieves smooth reduction of the rotational speed. Further, the driving apparatus requires little power dissipation for the braking operation, compared with the braking operation by applying a large current to the coils so as to reverse the rotational direction. Thus, the present invention achieves minimization of the power dissipation for the motorized roller.

BRIEF DESCRIPTION OF THE DRAWINGS

FIG. 9 is a timing diagram showing signals of each section when the driving signal and the braking signal are applied thereto in the driving apparatus shown in FIG. 1;

DESCRIPTION OF THE PREFERRED EMBODIMENTS

Now, a preferred embodiment of the present invention will be described below, making reference to the accompanying drawings. First, a structure relating to the rotation control of the brushless motor and a method thereof, and then, a structure relating to the braking control of the present invention and a method thereof are described in detail.

Figure 1:
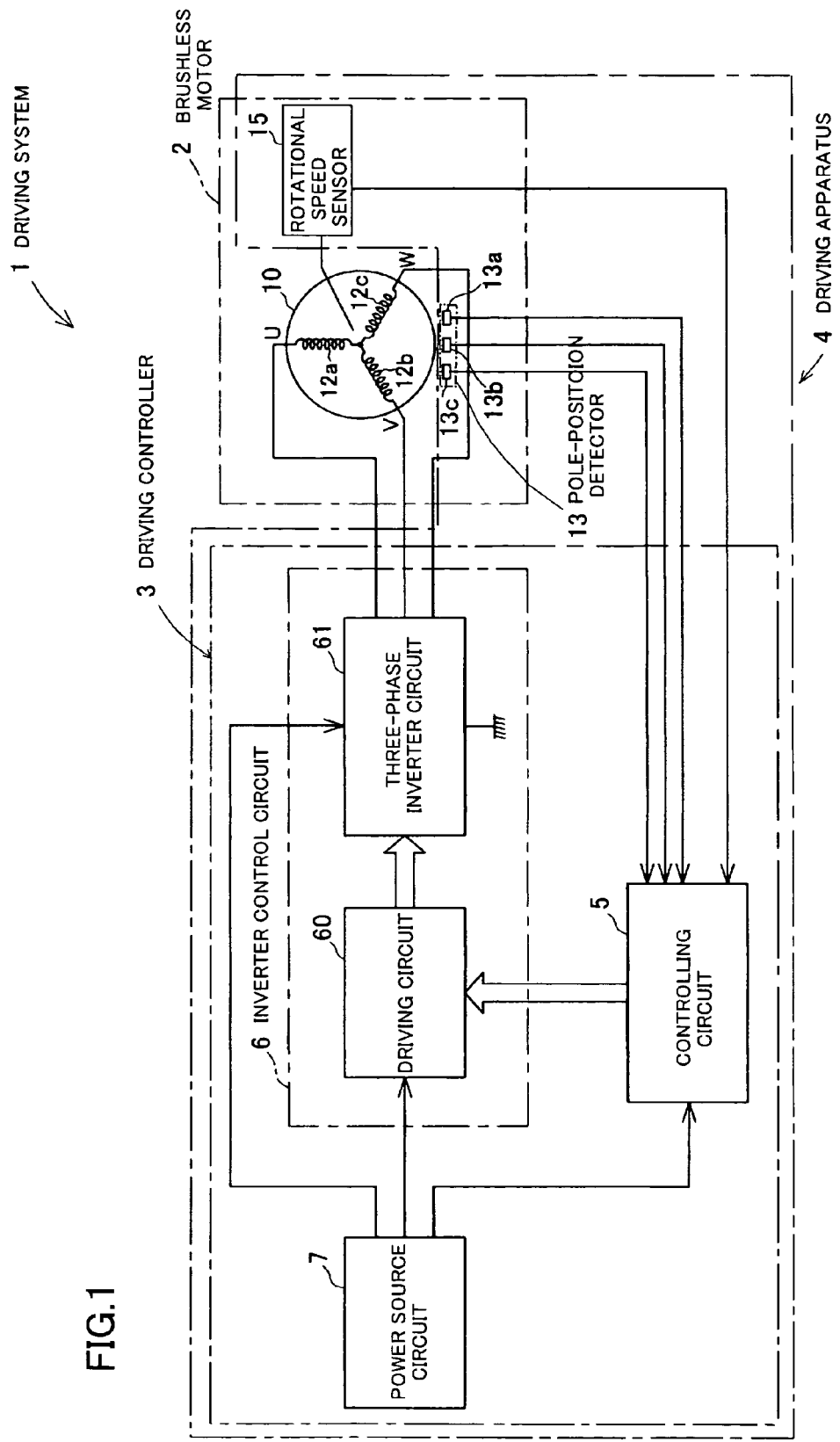
FIG. 1 is a block diagram of a driving apparatus for a brushless motor that is a preferred embodiment of this invention.

Referring to FIG. 1, a driving system 1 for driving a brushless motor relating to the embodiment consists essentially of a brushless motor 2 and a driving controller 3 for the motor. The driving controller 3 comprises a controlling circuit 5, an inverter control circuit 6 and a power source circuit 7. The brushless motor 2 comprises a motor body 10, a pole-position detector 13 and a rotational speed sensor (viz. a rotational speed sensing means) 15. Describing in detail, the driving system 1 includes a driving apparatus 4 involving the pole-position detector 13 and the rotational speed sensor 15 of the brushless motor 2 and the driving controller 3. The driving system 1 is directed to effect a rotation control and a braking control by controlling application of the current to the brushless motor 2 by means of the inverter control circuit 6 in response to driving and braking signals generated at the controlling circuit 5.

Referring to FIG. 1, the brushless motor 2 comprises the motor body 10 and the rotational speed sensor 15.

Figure 2:
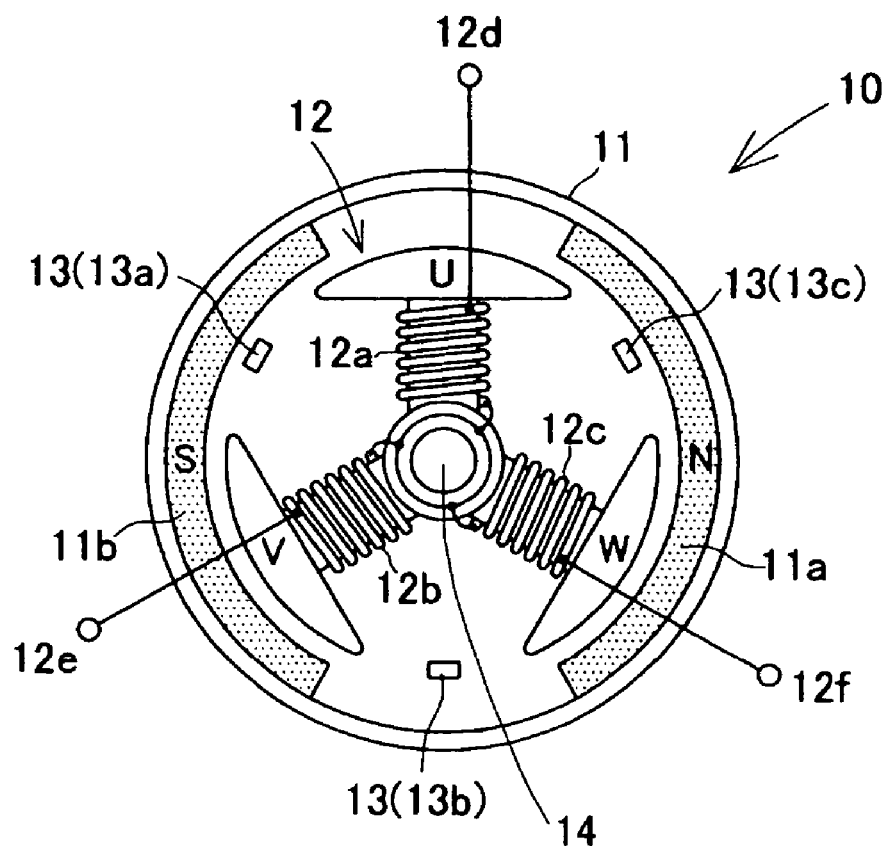
FIG. 2 is a schematic illustration showing an internal structure of the brushless motor shown in FIG. 1.

Referring to FIG. 2, the motor body 10 is designed to have an outer rotor 11 of hollow cylindrical shape with an inner stator 12 mounted to a central shaft 14 within the rotor 11. The brushless motor 2 employed in the embodiment is of three-phase type, with the rotor 11 having two magnetic poles and the stator 12 having three slots. That is, the three-phase brushless motor involved in the embodiment is of the so-called two-pole and three-slot type.

Referring to FIG. 2, permanent magnets 11a and 11b are secured to the inner surface of the rotor 11 with one type of magnetic pole facing to the other type of magnetic pole. Magnetic coils 12a, 12b and 12c are wound around the three slots (or phases) U, V and W of the stator 12 respectively in a same direction. Each of one ends of the coils 12a, 12b and 12c is mutually and electrically connected at the center of the motor body 10. On the other hand, each of another ends 12d, 12e and 12f of the coils 12a, 12b and 12c is derived out of the motor body 10. In other words, each of the three-phase magnetic coils 12a, 12b and 12c has two ends, one ends being connected in Y type at the center within the motor body 10 and another ends being connected to the inverter control circuit 6 arranged out of the motor body 10.

Hall effect sensors 13a, 13b and 13c for detecting the pole position of the rotor 11 are installed within the motor body 10. Each of the hall effect sensors 13a, 13b and 13c constitutes the pole-position detector 13 and secured at 120 degrees intervals around the central shaft 14 of the rotor 11.

The rotational speed sensor 15 (FIG. 1) incorporated in the brushless motor 2 has the function of outputting pulses in response to the rotation of the rotor 11, and is, for example, constituted by a rotary encoder. In the embodiment, the rotational speed sensor 15 is designed to output one pulse per one rotation of the rotor 11.

Figure 3:
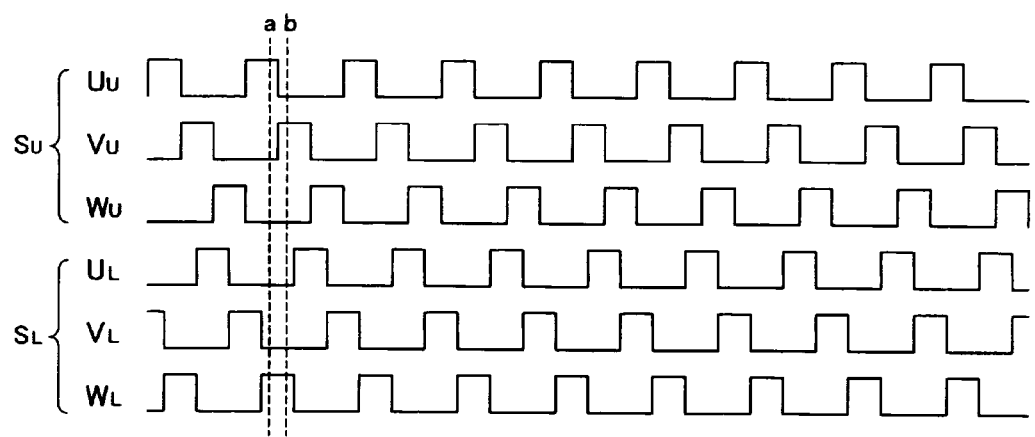
FIG. 3 is a timing diagram of a driving signal generated at the driving apparatus shown in FIG. 1.

The driving system 1 for driving the brushless motor in the embodiment generates driving signals shown in FIG. 3 by means of the controlling circuit 5 so as to sequentially switch application of a current to each of the coils U, V and W accommodated in the brushless motor 2. In other words, the controlling circuit 5 sequentially generates six driving signals UU, VU, WU, UL, VL and WL, each being at H (High) level for only 120 degrees and at L (Low) level for the rest of 240 degrees in response to a rotational position of the rotor 11 detected at the pole-position detector 13, which signals are outputted to the inverter control circuit 6.

Regarding phases of the driving signals, the signal VU has a lag of 120 degrees behind the signal UU, whereas the signal WU has a lag of 120 degrees behind the signal VU. On the other hand, the signal UL has a lag of 180 degrees behind the signal UU. The signal VL has a lag of 120 degrees behind the signal UL, whereas the signal WL has a lag of 120 degrees behind the signal VL.

Therefore, neither of any pair selected from the driving signals UU, VU and WU shows H level at the same time. Likewise, neither of any pair selected from the driving signals UL, VL and WL shows H level at the same time. The inverter control circuit 6 effects the rotation control, that will be described below, by sequentially switching application of the current to the coils 12a, 12b and 12c respectively of U, V and W phase in response to those driving signals.

Here, each of the driving signals shown in FIG. 3 is generated in a frequency corresponding to the detection signal from the pole-position detector 13, that is, based on the number of the rotation of the rotor 11, with the phase relationship described above, and a period of the driving signals varies depending on the rotational speed of the rotor 11.

Next, a driving circuit 60 and a three-phase inverter circuit 61 making up the inverter control circuit 6 are described in detail below.

The driving circuit 60 has the function of processing the driving signal and a braking signal described below that are transmitted from the controlling circuit 5, and generating signals adaptable to the three-phase inverter circuit 61.

Figure 4:
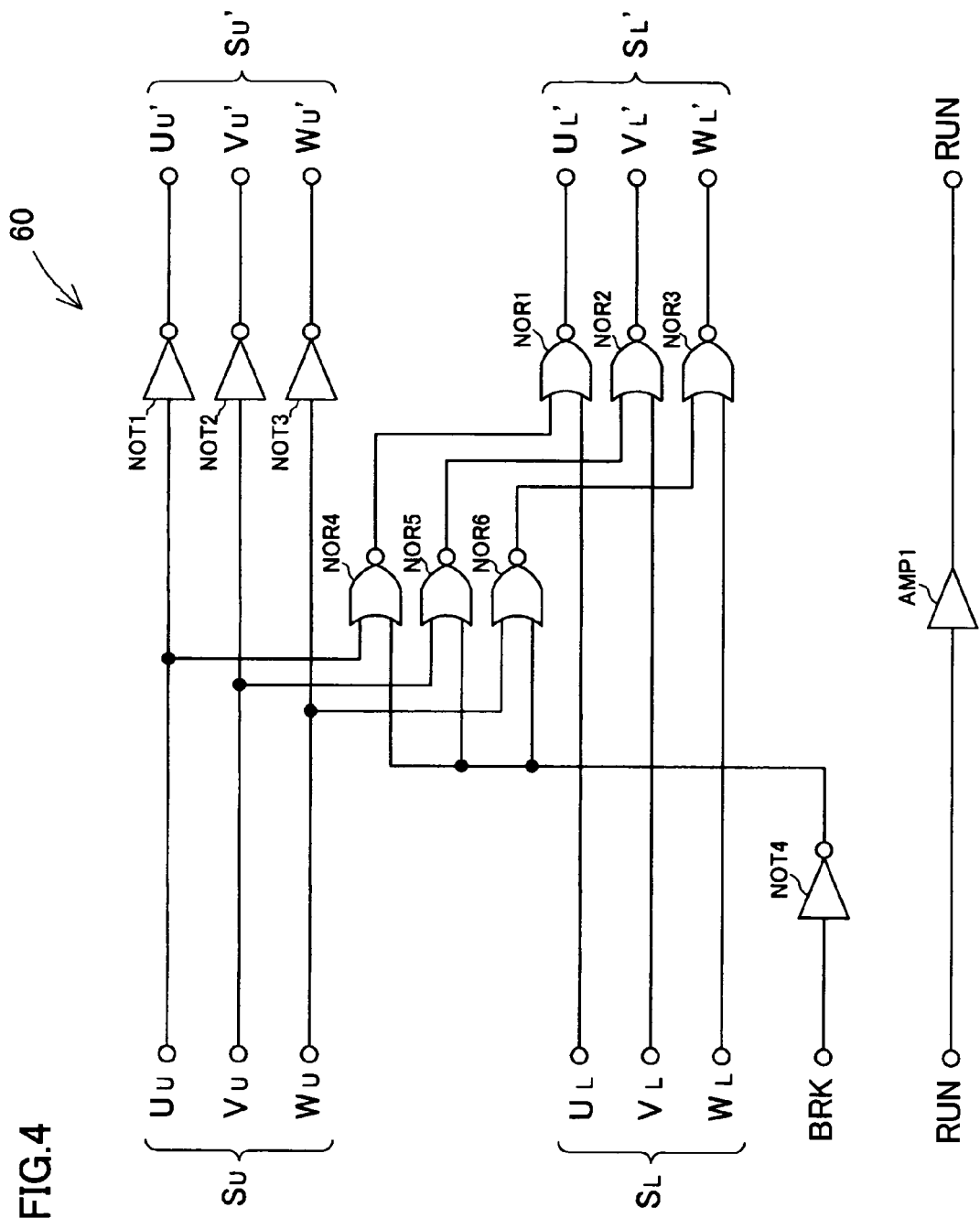
FIG. 4 is a detailed circuit diagram of a driving circuit in an inverter control circuit provided in the driving apparatus shown in FIG. 1.

Referring to FIG. 4, the driving circuit 60 comprises four NOT circuits (NOT 1, 2, 3 and 4) and six NOR circuits (NOR 1, 2, 3, 4, 5 and 6).

The driving signals UU, VU and WU inputted to the driving circuit 60 are reversed at the NOT circuits (NOT 1, 2 and 3) and outputted to the three-phase inverter circuit 61 as the driving signals UU', VU' and WU' respectively. The driving signals UL, VL and WL are applied to one of input terminals of a first group of the NOR circuits (NOR 1, 2 and 3) respectively. The signals outputted from the first group of the NOR circuits (NOR 1, 2 and 3), which are based on the driving signals UL, VL and WL and signals inputted thereto from a second group of the NOR circuits (NOR 4, 5 and 6) described below, are outputted to the three-phase inverter circuit 61 as the driving signals UL', VL' and WL' respectively.

The driving signals UU, VU and WU are used as the signals for driving an upper arm control section, described below, at the three-phase inverter circuit 61, thereby being hereinafter referred to as upper arm driving signals (SU). Likewise, the driving signals UL, VL and WL are used as the signals for controlling a lower arm control section, described below, at the three-phase inverter circuit 61, thereby being hereinafter referred to as lower arm driving signals (SL).

The lower arm driving signals (SL) are applied to one of the input terminals of each of the first group of the NOR circuits (NOR 1, 2 and 3), and each of the signals outputted from the second group of the NOR circuits (NOR 4, 5 and 6) is applied to another one of the input terminals. The upper arm driving signals (SU) are applied to one of input terminals of each of the second group of the NOR circuits (NOR 4, 5 and 6), and a braking input signal (BRK) reversed at the NOT circuit (NOT 4) described below is applied to another one of the input terminals of each of the second group. Thereby, during L level of the signal "BRK", the signal inputted to the second group of the NOR circuits (NOR 4, 5 and 6) from the NOT circuit (NOT 4) shows H level and the signals outputted therefrom show all L level. Consequently, during L level of the Signal "BRK", the signals outputted from the second group of the NOR circuits (NOR 4, 5 and 6) are all at L level, regardless of the upper arm driving signals (SU).

As a result, during L level of the signal "BRK", the driving circuit 60 simply reverses each of the upper arm driving signals (SU) and the lower arm driving signals (SL), and, in turn, outputs the upper arm driving signals (SU') and the lower arm driving signals (SL') to the three-phase inverter circuit 61.

The driving circuit 60 also outputs the rotation command signal (RUN) transmitted from the controlling circuit 5, that is amplified at an amplifier (AMP1), to the three-phase inverter circuit 61.

Figure 5:
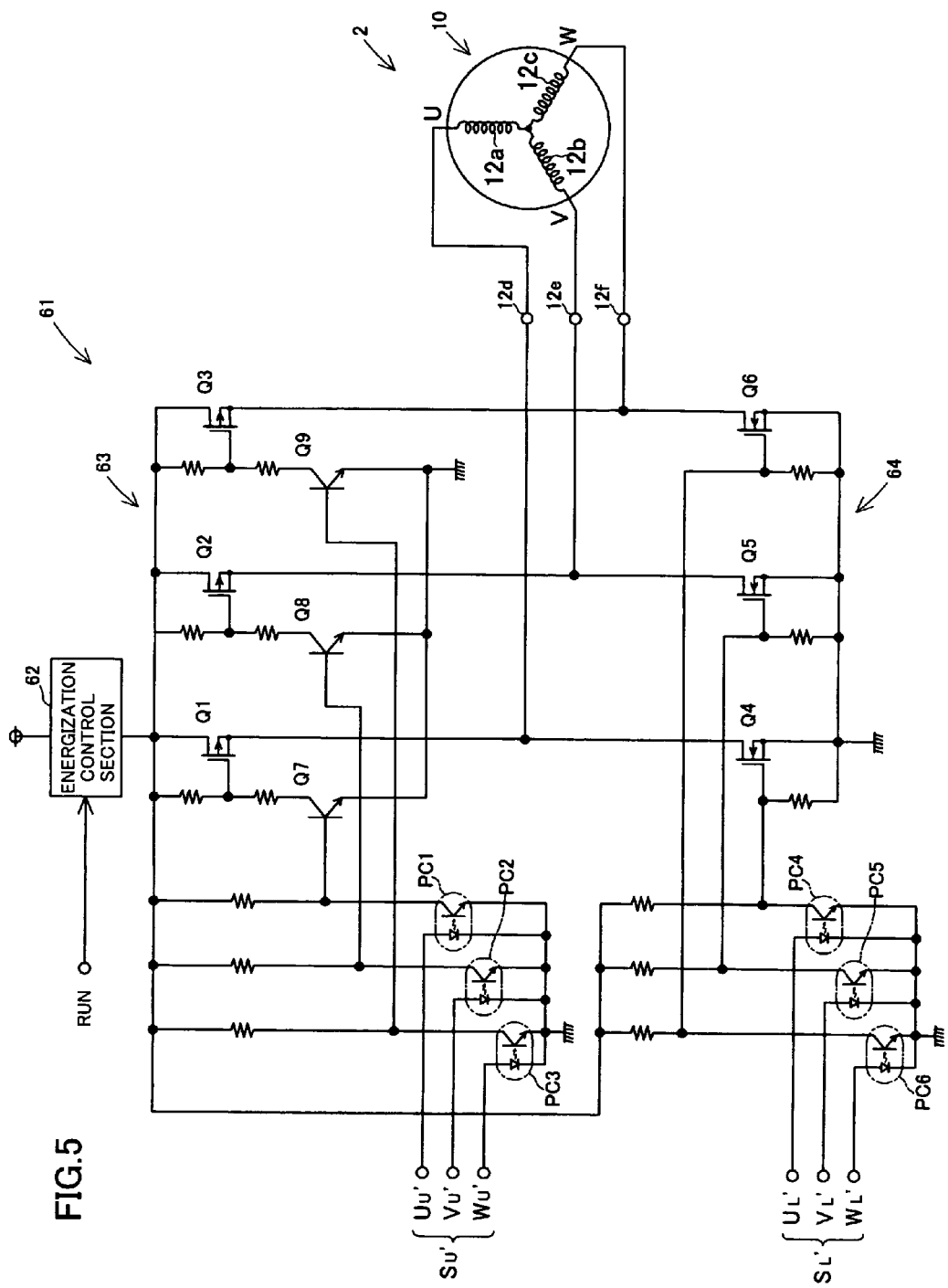
FIG. 5 is a detailed circuit diagram of a three-phase inverter circuit provided in the driving apparatus shown in FIG. 1.

Referring to FIG. 5, the three-phase inverter circuit 61 is essentially composed of six switching devices Q1, Q2, Q3, Q4, Q5 and Q6, and an energization control circuit 62, and is a circuit for switching application of the current to each of the U, V and W-phase magnetic coils 12a, 12b and 12c of the brushless motor 2 in response to the driving signals transmitted from the driving circuit 60.

The energization control circuit 62 has a function of permitting a positive voltage to be applied from a power source to the coils 12a, 12b and 12c when the signal "RUN" transmitted from the driving circuit 60 is at H level, and stopping the positive voltage application when the signal "RUN" is at L level.

The three-phase inverter circuit 61 consists essentially of an upper arm control section 63 (a first control section) and a lower arm control section 64 (a second control section). The upper arm control section 63 connects the energization control section 62 (the positive power source side) through the devices Q1, Q2 and Q3 to the ends of the coils 12d, 12e and 12f, respectively. Further, the lower arm control section 64 connects the ends of the coils 12d, 12e and 12f through the devices Q4, Q5 and Q6, respectively, to a ground potential (the negative power source side).

In the embodiment, the devices Q1, Q2 and Q3 of the upper arm control section 63 employ P-channel MOSFET, and the devices Q4, Q5 and Q6 of the lower arm control section 64 employ N-channel MOSFET.

The devices Q1, Q2 and Q3 are connected respectively to transistors Q7, Q8 and Q9 for controlling potentials of each gate. The transistors Q7, Q8 and Q9 are respectively connected to photocouplers PC1, PC2 and PC3 for controlling potentials of each base. Further, the devices Q4, Q5 and Q6 are connected respectively to photocouplers PC4, PC5 and PC6 for controlling potentials of each gate. The photocouplers PC1, PC2, PC3, PC4, PC5 and PC6 arranged at a position where the upper arm driving signals (SU) and the lower arm driving signals (SL) are inputted have a function of interfacing for meeting a difference of power-supply voltages between the driving circuit 60 and the three-phase inverter circuit 61, with reversing the transmitted driving signals.

As for the upper arm control section 63, for example, when the signal UU' among the upper arm driving signals (SU') inputted from the driving circuit 60 becomes active (L level), the current to a secondary side of the photocoupler PC1 (phototransistor) is turned off and the current to the transistor Q7 is turned on. That causes a potential difference between the gate sources of the device Q1, thereby rendering the device Q1 to be conductive. Likewise, when the signal VU' or WU' among the upper arm driving signal (SU') inputted from the driving circuit 60 becomes active (L level), the current to secondary sides of the photocoupler PC2 or PC3 (phototransistors) is turned off and the current to the transistor Q8 or Q9 is turned on, respectively. That causes a potential difference between the gate sources of the device Q2 or Q3, thereby rendering the device Q2 or Q3 to be conductive. That is, in this arrangement of the three-phase inverter circuit 61, when at least one of the upper arm driving signal (SU') becomes active (L level), the corresponding device Q1 (or Q2, Q3) is rendered conductive and the end 12d (or 12e, 12f) of the corresponding phase coils is connected to the positive power source. Consequently, the driving signals UU, VU and WU shown in FIG. 3 respectively function as the signals for connecting the ends 12d, 12e and 12f of the U, V and W-phase coils 12a, 12b and 12c to the positive power.

As for the lower arm control section 64, for example, when UL' among the lower arm driving signals (SL') inputted from the driving circuit 60 becomes active (L level), the current to a secondary side of the photocoupler PC4 (phototransistor) is turned off. That causes a potential difference between the gate sources of the device Q4, thereby rendering the device Q4 to be conductive. Likewise, when the driving signal VL' or WL' among the upper arm driving signals (SL') becomes active (L level), the device Q5 or Q6 is rendered conductive, respectively. That is, when at least one of the lower arm driving signals (SL') becomes active (L level), the corresponding device Q4 (or Q5, Q6) is rendered conductive and the end 12d (or 12e, 12f) of the corresponding phase coils is connected to the ground potential. Consequently, the driving signals UL, VL and WL shown in FIG. 3 respectively function as the signals for connecting the ends 12d, 12e and 12f of the U, V and W-phase (slots U, V and W) coils 12a, 12b and 12c to the ground potential.

In the driving system 1 of the embodiment, an operation that will be detailed below effects a basic rotation control of the brushless motor. In the description below, the rotation command signal (RUN) is assumed to be outputted.

Figure 6A:
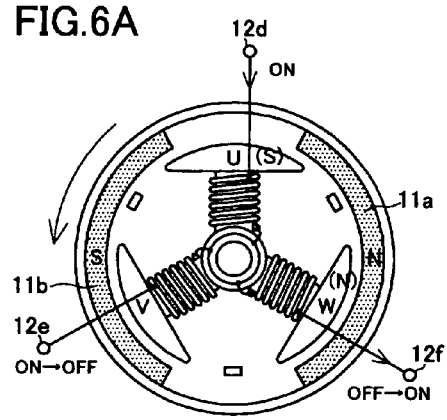
FIG. 6A is a schematic illustration showing a first stage of a rotation control of the brushless motor performed at the driving apparatus shown in FIG. 1.
Figure 6B:
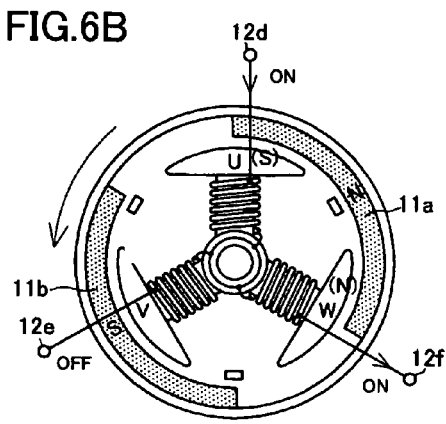
FIG. 6B is a schematic illustration showing a second stage of the rotation control of the brushless motor performed at the driving apparatus shown in FIG. 1.

First, referring to FIG. 3, while the driving signals UU and WL outputted from the controlling circuit 5 are at H level (referring to FIG. 3 dotted line (a)), the reversed signals UU' and WL' of L level are transmitted from the driving circuit 60 to the three-phase inverter circuit 61. Thereby the switching devices Q1 and Q6 are rendered conductive. Thus, the current is applied from the positive power source through the coils 12a and 12c to the ground potential, and as seen in FIGS. 6A and 6B, the U phase is magnetized to form a south pole and the W phase is magnetized to form a north pole. That generates repulsive and attractive forces between the stator 12 and the permanent magnets 11a and 11b secured to the rotor 11, thereby rotating the rotor 11 by a rotation torque toward a counterclockwise direction.

Figure 6C:
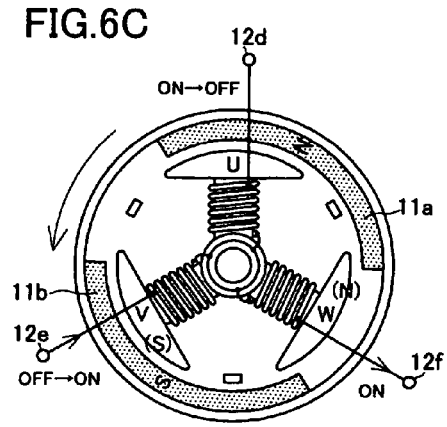
FIG. 6C is a schematic illustration showing a third stage of the rotation control of the brushless motor performed at the driving apparatus shown in FIG. 1.
Figure 6D:
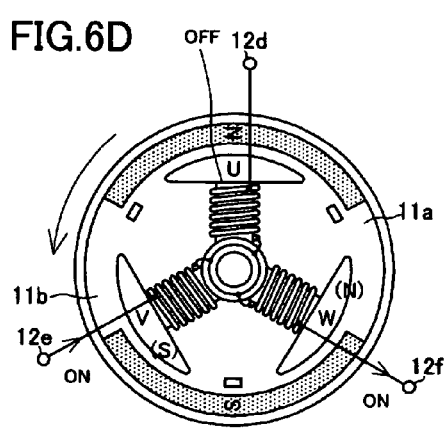
FIG. 6D is a schematic illustration showing a fourth stage of the rotation control of the brushless motor performed at the driving apparatus shown in FIG. 1.

In turn, advancing to the period that the driving signals VU and WL outputted from the controlling circuit 5 are at H level (referring to FIG. 3 dotted line (b)), the driving signal UU that has been at H level at the time point of the dotted line (a) of FIG. 3 shows L level, whereas the driving signal VU shows H level. Thus, as for the upper arm signals (SU') transmitted from the driving circuit 60 to the three-phase inverter circuit 61, the driving signal VU' instead of the driving signal UU' shows L level. On the other hand, as the driving signal WL is at H level at the time point of the dotted line (b) of FIG. 3, the driving signal WL' continues to be at L level. Thereby the devices Q2 and Q6 are rendered conductive. Thus, the current is applied from the positive power source through the coils 12b and 12c to the ground potential, which makes the V phase of the stator 12 magnetized to form a south pole and the W phase magnetized to form a north pole, as seen in FIGS. 6C and 6D. That generates repulsive and attractive forces between the V and W phases of the stator 12 and the permanent magnets 11a and 11b, thereby maintaining the rotor 11 to rotate toward the counterclockwise direction.

In this way, the three-phase inverter circuit 61 switches a pair of the switching devices rendered conductive simultaneously, from a pair of the switching devices [Q1 and Q6] to sequentially a pair of the devices [Q2 and Q6], [Q2 and Q4], [Q3 and Q4], [Q3 and Q5] and [Q1 and Q5], in response to the driving signals transmitted from the controlling circuit 5, so that the sequential electrical rotation of the U-phase, V-phase and W-phase magnetic poles effects the rotation control of the rotor 11.

In the description above, the structure of the driving system 1 for driving the brushless motor in the embodiment and the basic rotation control are illustrated. Now, a structure relating to the braking control of the driving system 1 for driving the brushless motor for the present invention and an operation thereof will be described in detail.

Figure 7:
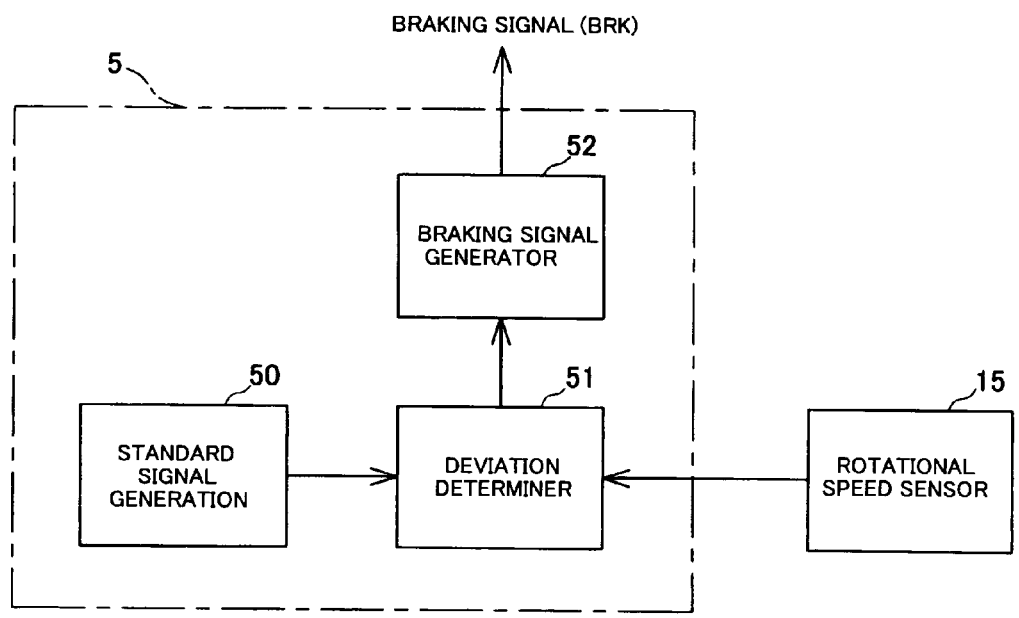
FIG. 7 is a block diagram of a part showing sections of a controlling circuit for generating a braking signal provided in the driving apparatus shown in FIG. 1.

Referring to FIG. 7, the controlling circuit 5 has a function of generating a braking input signal (BRK), as well as of generating the driving signals shown in FIG. 3. More specifically, the controlling circuit 5 comprises a standard signal generator 50, a deviation determiner 51 and a braking signal generator 52 for generating the signal "BRK". The standard signal generator 50 is a portion arranged to generating a standard signal for specifying a rotational speed. The deviation determiner 51 is a portion arranged to output a deviation signal based on the comparison of the standard signal generated in the standard signal generator 50 and a detection signal from the rotational speed sensor 15. The braking signal generator 52 is arranged to output the braking input signal (BRK) based on the deviation signal outputted from the deviation determiner 51.

More particularly, the embodiment is arranged that the standard signal generator 50 generates the standard clock pulses of 1 kHz and that the rotational speed sensor 15 outputs the detection signal pulses based on the rotational speed of the rotor 11. It is further arranged that, when the detection signal pulses outputted from the rotational speed sensor 15 becomes one tenths as many frequency as the standard clock pulses, that is, 100 Hz, the rotational speed of the rotor 11 corresponds to the standard rotational speed specified by the standard clock pulses.

Figure 8A:
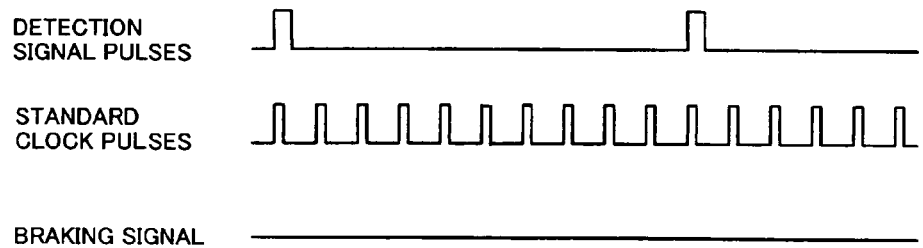
FIG. 8A is a timing diagram of a first state in which the braking signal is generated in response to a rotational speed of a rotor by the structure shown in FIG. 7.

In this arrangement, for example, when the rotational speed of the rotor 11 is the predetermined value and the frequency of the detection signal pulses is 100 Hz, as seen in FIG. 8(a), the standard clock pulses counted during one period of the detection signal pulses (hereinafter referred to as the measured clock pulses if necessary) are ten clock pulses, and the deviation determiner 51 outputs zero for the deviation signal. In this case, the braking signal generator 52 generates the braking input signal (BRK) of L level.

Figure 8B:
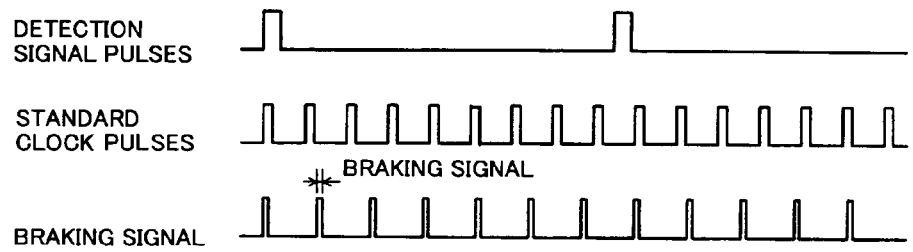
FIG. 8B is a timing diagram of a second state in which the braking signal is generated in response to the rotational speed of the rotor by the structure shown in FIG. 7.
Figure 8C:
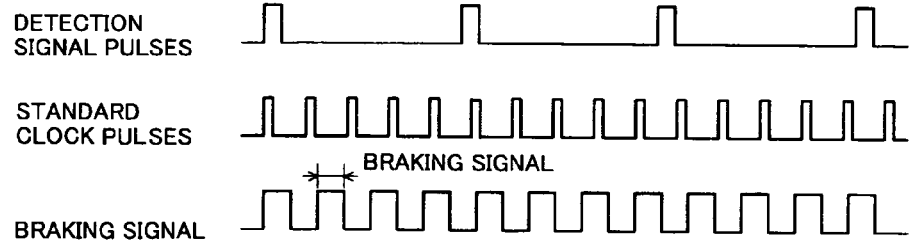
FIG. 8C is a timing diagram of a third state in which the braking signal is generated in response to the rotational speed of the rotor by the structure shown in FIG. 7.

On the other hand, if and when the rotational speed increases due to any cause, for example, an external force, during the rotation control of the brushless motor 2, the frequency of the detection signal pulses is beyond 100 Hz and its period becomes short. Thereby, as seen in FIG. 8B, the number of the standard clock pulses (the measured clock pulses) counted during one period of the detection signal pulses decreases (nine clocks in FIG. 8B). Further, if and when the rotational speed further increases, as seen in FIG. 8C, the number of the measured clock pulses further decreases (five clock pulses in FIG. 8C).

Consequently, the deviation determiner 51 outputs the braking signal that is "on" time adjusted depending on the number of the standard clock pulses counted during one period of the detection signal pulses. More particularly, for example, as seen in FIG. 8B, when the number of the measured clock pulses, such as nine clock pulses, is close to that of the standard clock pulses detected in case of the normal rotation of the rotor 11 (ten clock pulses in the embodiment, hereinafter referred to as the number of predetermined clock pulses if necessary), the output level of the deviation signal is reduced and the braking signal generator 52 outputs the braking input signal (BRK) that is pulse width modulated to shorten the "on" time. On the other hand, if and when the number of the measured clock pulses, such as five clock pulses, as seen in FIG. 8C, is far from that of the predetermined clock pulses, the output level of the deviation signal is increased depending on the decrease of the number of the clock pulses, that is, the deviation between the number of the measured clock pulses and that of the predetermined clock pulses, and the braking signal generator 52 outputs the braking input signal (BRK) that is pulse width modulated to lengthen the "on" time.

The embodiment is constituted by outputting the deviation signal of ten stages from nine clocks to zero clock of the measured clock pulses, based on the number of the standard clock pulses (or the measured clock pulses) counted during one period of the detection signal pulses.

In such a manner, the braking input signal (BRK) generated by the controlling circuit 5 is transmitted to the driving circuit 60 of the inverter control circuit 6. The braking input signal (BRK) transmitted to the driving circuit 60, as seen in FIG. 4, is applied to one of the input terminals of the second group of the NOR circuits (NOR 4, 5 and 6) after being reversed at the NOT circuit (NOT 4). The upper arm driving signals (SU) are respectively applied to the other terminals of the second group of the NOR circuits (NOR 4, 5 and 6).

Consequently, for example, in the time point shown by the dotted line (a) in FIG. 9, that is, when the signal "BRK" is at H level and the driving signals UU or WL are at H level, the signal of L level that is reversed at the NOT circuit (NOT 4) is applied to each one of the terminals of the second group of the NOR circuits (NOR 4, 5 and 6), whereas the driving signal UU of H level is applied to the other terminal of the NOR circuit (NOR4) and the driving signals VU and WU of L level are applied to the other ones of the terminals of the NOR circuits (NOR 5 and 6) respectively. As a result, in the time point of the dotted line (a) in FIG. 9, the output from the NOR circuit (NOR 4) shows L level and the outputs from the NOR circuits (NOR 5 and 6) show H level.

As described above, the driving signal UL of L level has already been applied to one of the terminals of the NOR circuit (NOR 1). Therefore, when the signal of L level is applied to the other terminal of the NOR circuit (NOR1) from the NOR circuit (NOR4), the driving signal UL' of H level is outputted therefrom.

Further, the driving signal WL of H level has already been applied to the NOR circuit (NOR 3). Therefore, the NOR circuit (NOR 3) outputs the driving signal VL' of L level, regardless of the input from the NOR circuit (NOR 6).

On the other hand, the driving signal VL of L level has already been applied to one of the terminals of the NOR circuit (NOR 2), whereas the signal of H level outputted from the NOR circuit (NOR 5) is applied to the other terminal of the NOR circuit (NOR 2). Therefore, the driving signal VL' (braking output signal) outputted from the NOR circuit (NOR 2) becomes active (L level). That is, because of the braking input signal (BRK), the NOR circuit (NOR 2) outputs the active driving signal VL' (L level) to the three-phase inverter circuit 61.

Similarly, in the time point shown by the dotted line (b) in FIG. 9, that is, when the braking input signal (BRK) is applied on condition that the driving signals VU and WL are at H level, the signals VU' and WL' show L level (active) and the active driving signal UL' (the braking output signal) of L level is outputted. Further, in the time point shown by the dotted line (c) in FIG. 9, that is, when the signal "BRK" is applied on condition that the driving signals VU and UL are at H level, the signals VU' and UL' become active (L level) and the active driving signal WL' (the braking output signal) of L level is outputted.

In other words, when the driving and braking signals are applied to the driving circuit 60, as seen in FIG. 9, the lower arm driving signals (SL') of any phases except those in which the upper arm driving signals (SU) and/or the lower arm driving signals (SL) is at H level, that is, of any phase in which both of the upper arm driving signals (SU) and the lower arm driving signals (SL) are at L level are outputted as a braking output signal of L level and transmitted to the three-phase inverter circuit 61.

Such a process as effecting the braking with applying the driving and braking signals will be described below, making reference to FIG. 10.

Figure 10A:
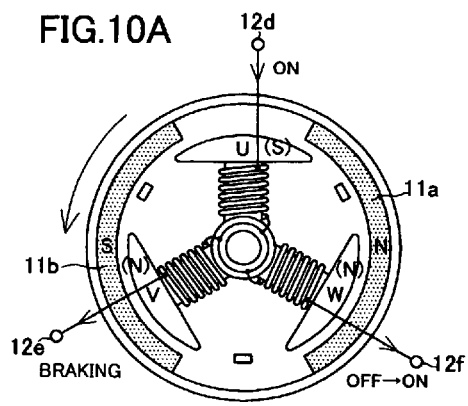
FIG. 10A is a schematic illustration showing a first stage of the rotation control and a braking control when the driving signal and the braking signal are applied thereto respectively in the driving apparatus shown in FIG. 1.
Figure 10B:
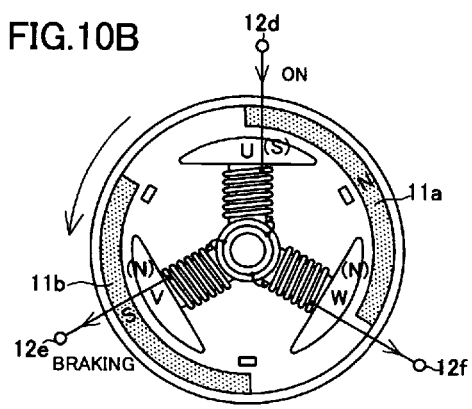
FIG. 10B is a schematic illustration showing a second stage of the rotation control and the braking control when the driving signal and the braking signal are applied thereto respectively in the driving apparatus shown in FIG. 1.

First, the description is detailed, making reference to the state of the dotted line (a) in FIG. 9. When the braking input signal (BRK) is applied on condition that the driving signals UU and WL are at H level, not only the driving signals UU' and WL' but also the signal VL' shows L level. That is, the driving signal VL' functions as the braking output signal. Thereby, as seen in FIGS. 10A and 10B, part of the current flowing from the positive power source into the coil 12a in response to the driving signal flows through the coil 12c to the ground potential, and the rest of the current flows through the coil 12b. That is, the current flowing into the coil 12a branches off into the coils 12b and 12c. Thus, as seen in FIGS. 10A and 10B, the U-phase is magnetized to form the south pole and the W-phase is magnetized to form the north pole, and additionally the V-phase is also magnetized to form the north pole in response to the driving signal VL' functioning as the braking output signal. As a result, in the state of the dotted line (a) in FIG. 9, magnetization of the U and W-phases effects the driving of the rotation of the rotor 11, while an attractive force caused between the V-phase and the permanent magnet 11b along with magnetization of the V-phase puts a braking force against the rotation of the rotor 11.

Figure 10C:
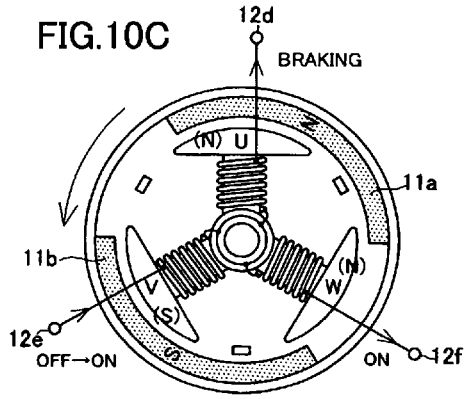
FIG. 10C is a schematic illustration showing a third stage of the rotation control and the braking control when the driving signal and the braking signal are applied thereto respectively in the driving apparatus shown in FIG. 1.
Figure 10D:
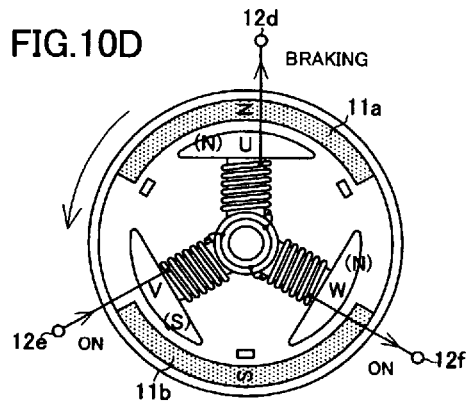
FIG. 10D is a schematic illustration showing a fourth stage of the rotation control and the braking control when the driving signal and the braking signal are applied thereto respectively in the driving apparatus shown in FIG. 1.

Further, the phase advances to the state of the dotted line (b) in FIG. 9. When the braking input signal (BRK) is applied on condition that the driving signals VU and WL are at H level, not only the driving signal VU' and WL' but also the signal UL' becomes active (L level). Thereby, as seen in FIGS. 10C and 10D, the current flowing from the positive power source through the coils 12b and 12c to the ground potential in response to the driving signal magnetizes the V-phase to form the south pole and the W-phase to form the north pole. Whereas, the current flowing through the coil 12b branches off into the coil 12a in response to the driving signal UL' functioning as the braking output signal, and the U-phase is also magnetized to form the north pole in response to the braking signal. As a result, magnetization of the V and W-phases effects the driving of the rotation of the rotor 11, whereas a repulsive force caused between the U-phase and the permanent magnet 11a along with magnetization of the U-phase puts the braking force against the rotation of the rotor 11.

Figure 10E:
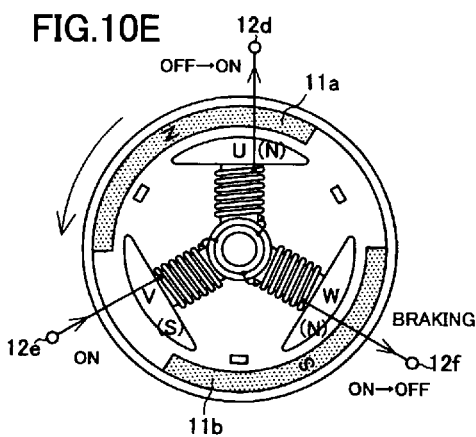
FIG. 10E is a schematic illustration showing a fifth stage of the rotation control and the braking control when the driving signal and the braking signal are applied thereto respectively in the driving apparatus shown in FIG. 1.
Figure 10F:
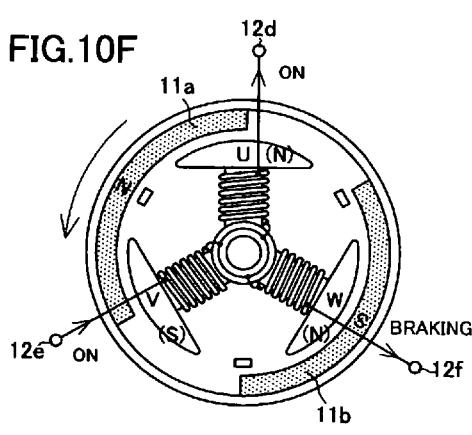
FIG. 10F is a schematic illustration showing a sixth stage of the rotation control and the braking control when the driving signal and the braking signal are applied thereto respectively in the driving apparatus shown in FIG. 1.

Still further, the phases advances to the state of the dotted line (c) in FIG. 9. When the braking input signal (BRK) is applied on condition that the driving signal VU and UL are at H level, not only the driving signal VU' and UL' but also the signal WL' becomes active (L level). Thereby, as seen in FIGS. 10E and 10F, the current flowing from the positive power source through the coils 12b and 12a to the ground potential in response to the driving signal magnetizes the V-phase to form the south pole and the U-phase to form the north pole, while the current flowing through the coil 12b branches off into the coil 12c in response to the driving signal WL' functioning as the braking output signal, and the W-phase is also magnetized to form the north pole in response to the braking signal. As a result, magnetization of the V and U-phases effects the driving of the rotation of the rotor 11, while the attractive force caused between the W-phase and the permanent magnet 11b along with magnetization of the W-phase puts the braking force against the rotation of the rotor 11.

The sequential input of the driving signal sequentially switches the excited and braked phases by means of the control described above, thereby rendering the rotation control and the braking control. When the rotor 11 reduces the rotational speed to the predetermined value, the braking signal stops and shifts to the normal rotation control.

In such arrangement, according to the driving system 1 for driving a brushless motor relating to the embodiment, electrically connecting the coils of the phases except those being excited by the rotation control to the ground potential (or the negative power source) and applying a current therethrough enables the braking control with maintaining the rotation control.

Thereby, even if the rotational speed becomes beyond the predetermined value by the external force or gravity on the rotor 11, braking by the braking signal enables the rotational speed to be stabled. Further, the present invention, compared to a braking control by means of a magnetization to reverse a rotational direction or a power generating control by stopping an excitation, enables the vibration and impact resulting from the application of the braking force to be remarkably reduced and the increase of the applied current to be restrained.

Further, the embodiment achieves the braking control by only applying a current to the coils not being excited, except the coils being excited under the rotation control, thereby extremely simplifying the structure for braking.

As for the embodiment, though the three-phase, two-pole and three-slot type is illustrated as the brushless motor 2, a brushless motor having the number of the poles of the rotor and the slots of the stator different therefrom may employ the similar structure.

Further, as for the embodiment, such a structure as connecting the upper arm control section 63 of the three-phase inverter circuit 61 to the positive power source and the lower arm control section 64 to the ground potential is described above. However, the present invention is not limited thereto. More particularly, for example, it is possible to employ a structure connecting the upper arm control section 63 to the positive power source and the lower arm control section 64 to the negative power source, or a structure connecting the upper arm control section 63 to the ground potential and the lower arm control section 64 to the negative power source, so as to properly interface to meet with the driving circuit 60.

Still further, as for the embodiment, the frequency of the standard clock pulses generated by the standard signal generator 50 shown in FIG. 7 is fixed in the description above. However, for example, it is possible to reduce the frequency of the standard clock pulses in response to the speed command signal inputted to the controlling circuit 5, thereby generating a corresponding braking signal so as to sequentially reduce the rotational speed of the rotor 11.

Still further, as for the embodiment, the driving circuit 60 of the inverter control circuit 6 is constituted by a logical circuit, but it is not limited thereto and it is possible to generate similar signals by a program processing by using CPU.

Still further, as for the embodiment, the three-phase inverter circuit 61 of the inverter control circuit 6 employs the MOSFET, but it is not limited thereto and it is possible to be constituted by a junction transistor, a thyristor and so on.

Figure 11:
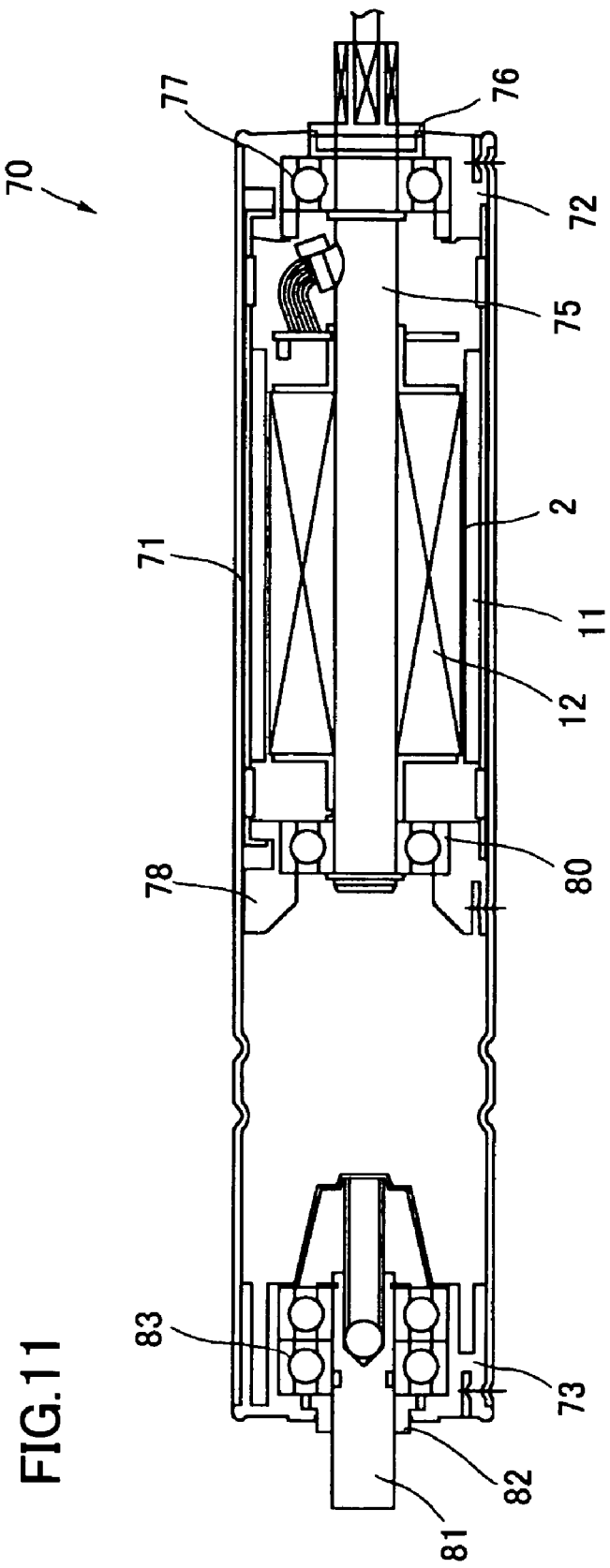
FIG. 11 is a sectional view of a motorized roller to be used in relation to a preferred embodiment of the invention.

The brushless motor 2 may be incorporated in a driving source, for example, a motorized roller 70 shown in FIG. 11. More particularly, the roller 70 incorporates the motor 2 as the driving source within an outer roller body 71 that is of hollow cylindrical shape made of metal. The rotor 11 of the motor 2 is secured to the inner surface of the roller body 71 so as not to be relatively rotatable. Caps 72 and 73 are installed on the opposite ends in the axial direction of the roller body 71. A fixed shaft 75, which is fixed to a frame (not shown), of the motor 2 is supported within an installing hole 76 for the shaft formed through the cap 72 via a bearing 77 and sticks out from the cap 72 toward the axial direction. The shaft 75 is also supported within a fixed member 78 of substantially hollow cylindrical shape secured to the inner surface of the roller body 71 via a bearing 80.

Another fixed shaft 81 coaxial with the shaft 75 is supported within an installing hole 82 for the shaft formed through the cap 73 via a bearing 83. As for the embodiment, the shafts 75 and 81 are separated from each other within the roller body 71, but may be connected each other integrally or unitarily within the roller body 71.

In the motorized roller 70, when an electrical current is applied to the brushless motor 2, the rotor 11 rotates in low speed about the central axis of the shaft 75. Since the rotor 11 is secured to the roller body 71 not to be relatively rotatable, the roller body 71 rotates in low speed, connected with the rotation of the rotor 11, and presents high torque power for the rotation.

Figure 12:
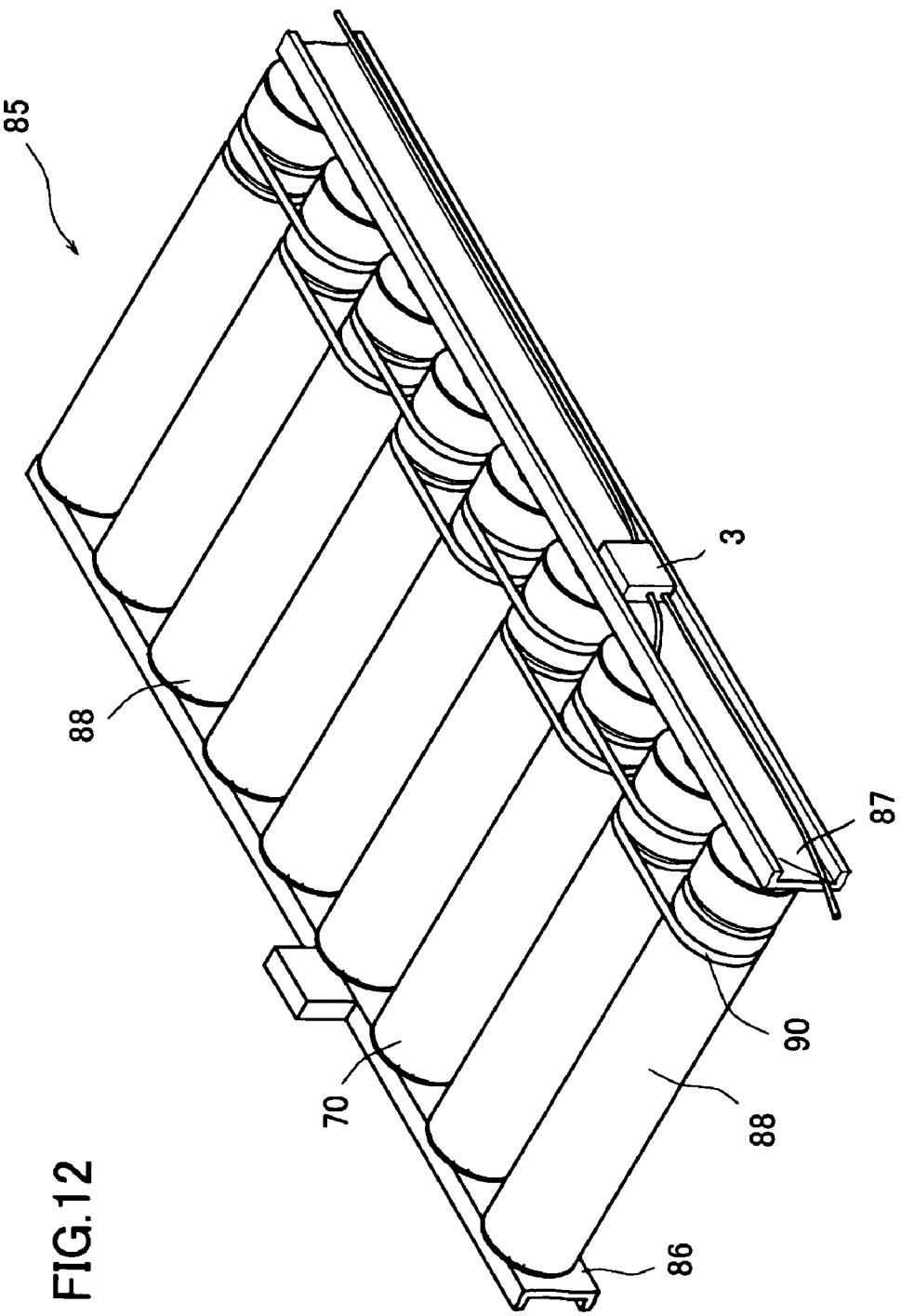
FIG. 12 is a perspective view of a conveying apparatus incorporating the motorized roller shown in FIG. 11.

The motorized roller 70 is used as the driving source, for example, for a conveying apparatus 85 shown in FIG. 12. The conveying apparatus 85 comprises a pair of side frames 86 and 87 with the motorized roller 70 and a plurality of free rollers 88 each without a driving source therein arranged in parallel.

The conveying apparatus 85 is constituted by connecting the motorized roller 70 and the free rollers 88 by endless belts 90. The free rollers 88 are rotated by the rotational force of the motorized roller 70 transmitted via the endless belts 90. Not only a load on the motorized roller 70 itself but also any load on the free rollers 88 connected by the belts 90 acts on the motorized roller 70. The motorized roller 70 rotates in low speed and presents high torque power for the rotation, thereby rendering alone a number of the free rollers 88 to be rotated. The motorized roller 70 is possible to be employed as the power source for all kinds of conveying apparatus such as a belt conveyor as well as a roller conveyor.

Figure 13:
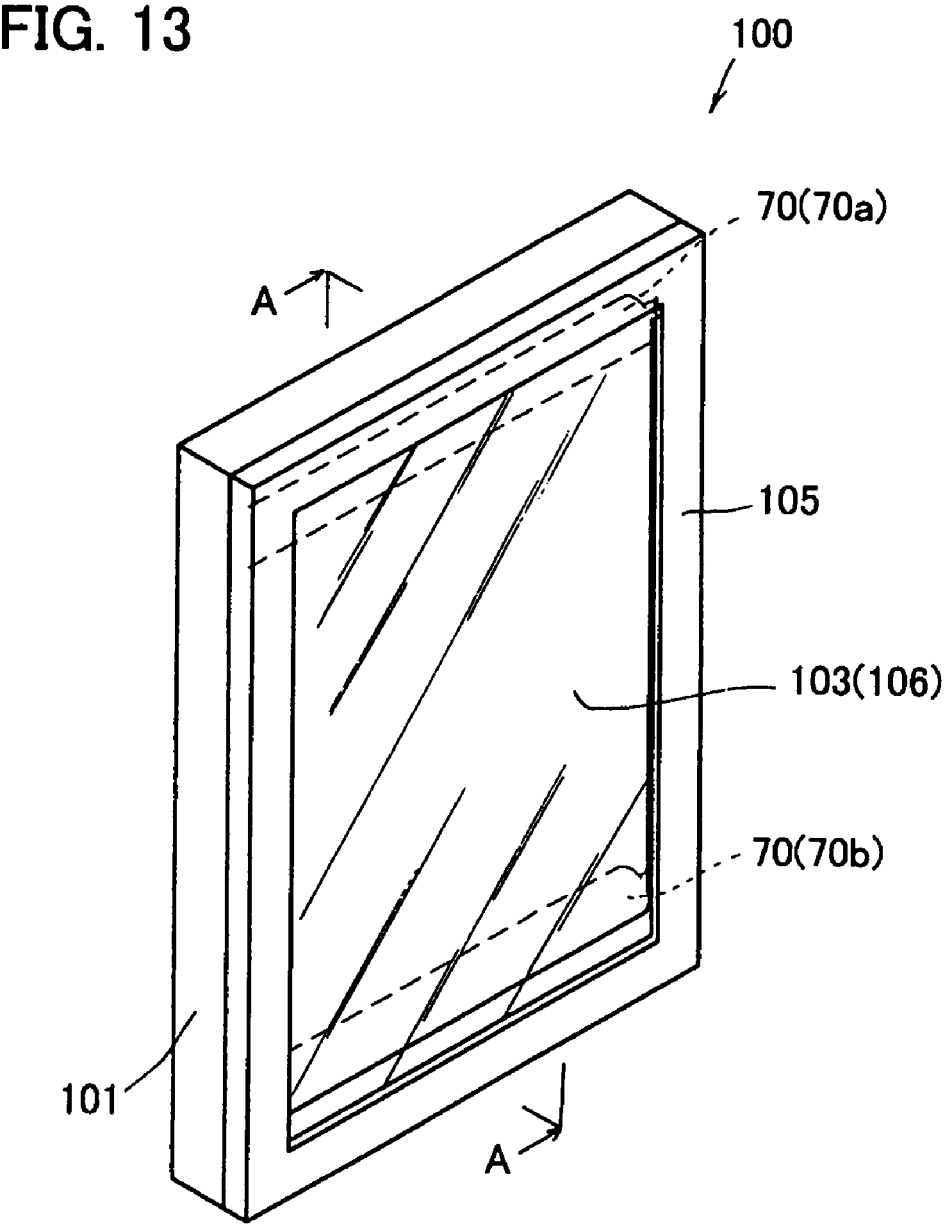
FIG. 13 is a perspective view of a display incorporating the motorized roller shown in FIG. 11.

The motorized roller 70 described above may be employed as a winding device for a display 100 as shown in FIG. 13. The display 100 consists of a main body 101 and a cover 105 fitted thereon and exposes a portion of a film 102 of belt-like shape and with letters and/or figures thereon from a window 103 formed in the cover 105 at the front of the main body 101 by winding the film 102 by means of two motorized rollers 70 positioned in parallel in the proximity of the upper and the lower ends of the main body 101.

Figure 14:
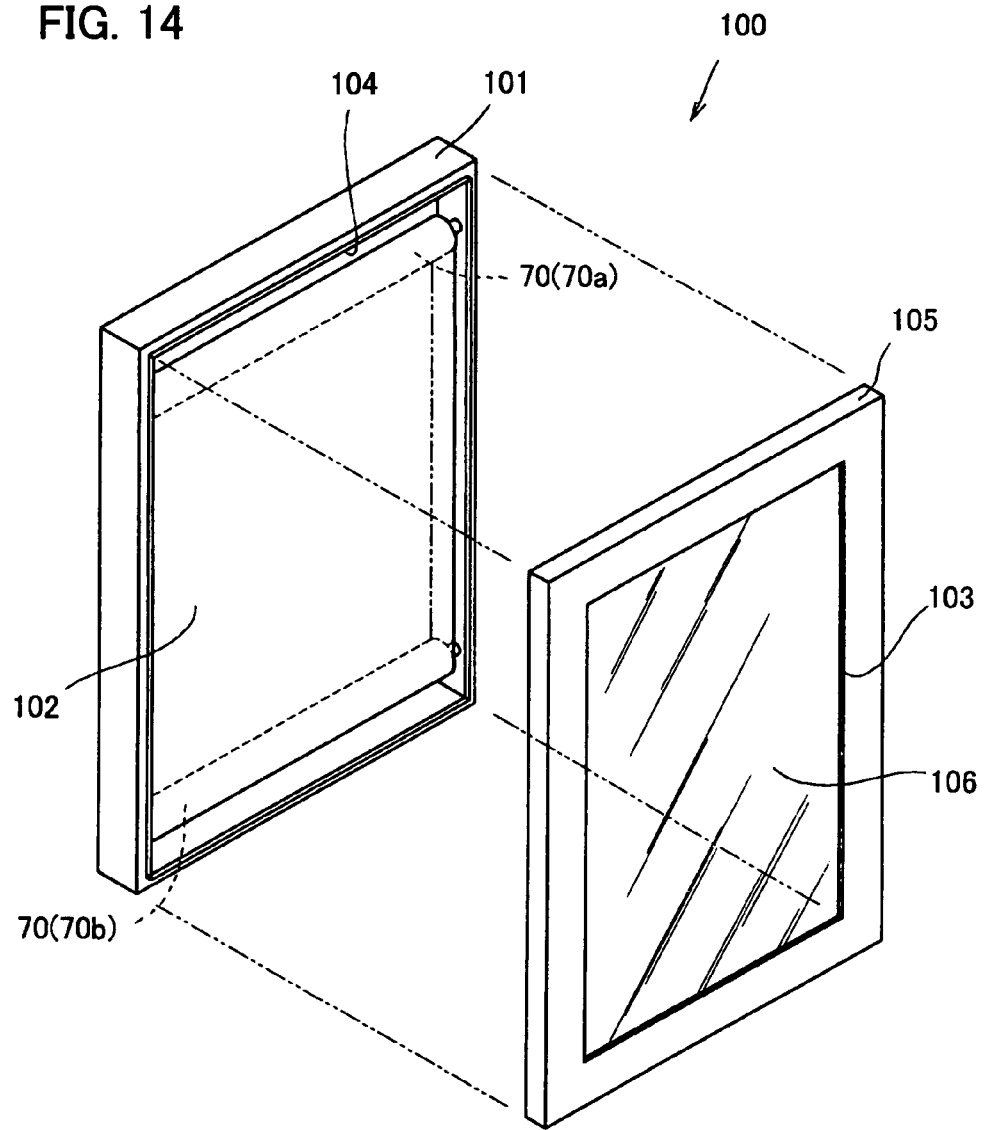
FIG. 14 is an exploded perspective view of the display shown in FIG. 13.
Figure 15:
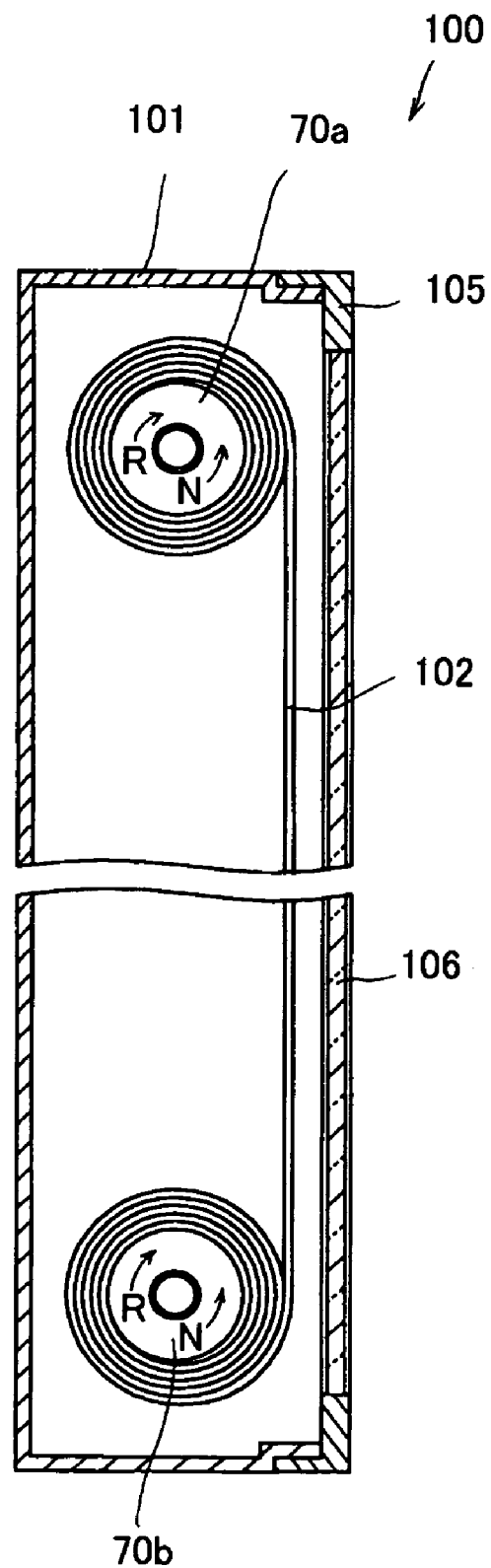
FIG. 15 is a sectional view of the display taken along line A—A of FIG. 13.
Figure 16:
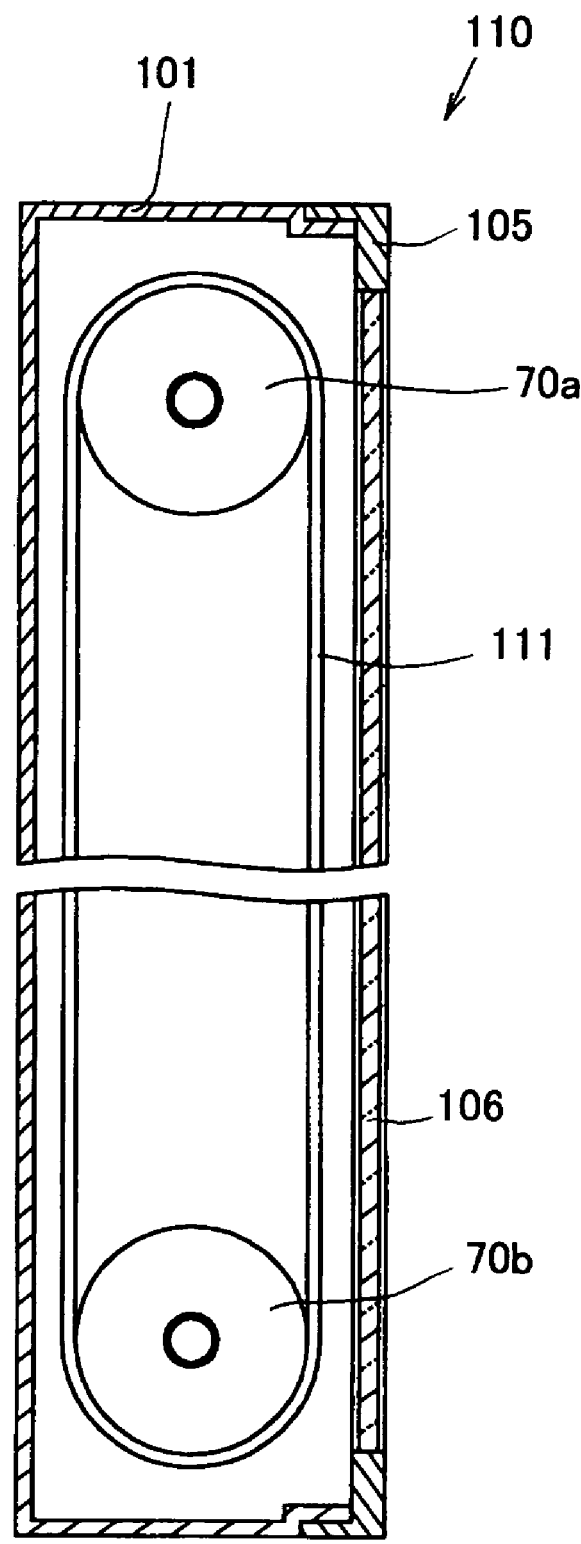
FIG. 16 is a sectional view of another display incorporating the motorized roller shown in FIG. 11.

More specifically, the main body 101 is of a box-like shape made of, for example, metal or plastics and has an opening 104 at its front. As shown in FIGS. 14 and 15, the two motorized rollers 70 (hereinafter referred to as 70*a* and 70*b* if necessary) are positioned in parallel in the proximity of the upper and the lower ends of the main body 101 with their fixed shafts 75, 81 fastened unrotatably relative to the main body 101 and the upper and lower ends of the film 102 are fixed to the surfaces of the roller bodies 71, respectively. Each of the motorized rollers 70*a* and 70*b* winds the film 102 attached to its roller body 71 when the brushless motor 2 incorporated therein is energized.

The cover 105 is a rectangular frame to cover the opening 104 at the front of the main body 101 and has a window 103 at its center. The window 103 has a transparent plastic plate 106 fitted therein for having the film 102 provided in the main body 105 to be seen from outside as well as protecting the film 102.

The motorized rollers 70*a* and 70*b* are synchronized and driven so that they should rotate in the same direction, as shown by arrows N (denoting normal rotation) and arrows R (denoting reverse rotation) in FIG. 15. The display 100 winds the film 102 upwards and downwards relative to the window by energizing and rotating both the motorized rollers 70*a* and 70*b*, keeping the film stretched between the rollers 70*a* and 70*b*. Then the display 100 stops winding so as to fix the film 102 at a desired or predetermined position.

Though both the motorized rollers 70*a* and 70*b* of the above-described display 100 are energized so as to wind the film 102, the invention is not limited by such an embodiment. Only one motorized roller 70*a* or 70*b* for winding the film 102 thereon may be energized, with the other motorized roller 70*b* or 70*a* for winding off the film 102 unenergized.

Though the above-described display 100 uses a film 102 having its ends fixed to the roller bodies 71 of the motorized rollers 70*a* and 70*b*, the invention is not limited by such an embodiment. For example, an endless film 111 may be spanned over the motorized rollers 70*a* and 70*b*, as shown in a display 110 in FIG. 6. In the case of using such an endless film 111, one of the motorized rollers 70*a* and 70*b* may be displaced by a free roller 88 incorporating no motor.

Though the above-described display 100 has the motorized rollers 70*a* and 70*b* positioned in the proximity of the upper and the lower ends of the display 100 so as to move the film 102 vertically, the invention is not limited by such an embodiment. The motorized rollers 70*a* and 70*b* may be positioned in the proximity of the right and the left ends of the main body 101 of the display 100 so as to move the film 102 horizontally.

The display 100 may use a film 102 made of a light-transmitting material and provide a light-emitting component such as a fluorescent lamp and a filament lamp in the main body 101 so as to light up the film 102 from behind the film 102.

What is claimed is:

1. A driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising:

a pole-position detector for detecting a position of a magnetic pole and outputting the detection signal;

a controlling circuit for generating a driving signal in response to the detection signal from the pole-position detector;

an inverter control circuit for controlling application of the current to each of the coils; and a rotational speed sensor for sensing a rotational speed of the rotor;

wherein the controlling circuit is adapted to generating a braking signal based on the rotational speed sensed by the rotational speed sensor and transmitting the driving and braking signals to the inverter control circuit, and wherein the inverter control circuit is adapted to effecting the rotation control by sequentially switching application of the current to each of the coils upon reception of the driving signal and effecting the braking control by applying the current to at least one coil except those coils being excited under the rotation control upon reception of a braking signal generated on condition that the rotational speed is beyond a predetermined value.

2. The driving apparatus as defined in claim 1, wherein the rotational speed sensor is adapted to outputting detection signal pulses of a frequency corresponding to the rotational speed of the rotor, and wherein the controlling circuit comprises a standard signal generator for generating standard clock pulses of a predetermined frequency for specifying a standard rotational speed of the rotor, a deviation determiner for comparing the standard clock pulses and the detection signal pulses so as to output a deviation signal based on one selected from a) the number of the standard clock pulses counted per one period of the detection signal pulse and b) the number of the detection signal pulses counted per one period of the standard clock pulse, and a braking signal generator for generating a braking signal based on the deviation signal.

3. The driving apparatus as defined in claim 1, wherein the rotational speed sensor is adapted to outputting detection signal pulses of a frequency corresponding to the rotational speed of the rotor, and wherein the controlling circuit comprises a standard signal generator for generating standard clock pulses of a predetermined frequency for specifying a standard rotational speed of the rotor, a deviation determiner for outputting a deviation signal by comparing the standard clock pulses and the detection signal pulses, and a braking signal generator for generating a braking signal based on the deviation signal, wherein the deviation signal has an output level that depends on one selected from a) the number of the standard clock pulses counted per one period of the detection signal pulse and b) the number of the detection signal pulses counted per one period of the standard clock pulse, and wherein a braking signal is outputted depending on the output level of the deviation signal.

4. The driving apparatus as defined in claim 1,
wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal that is pulse width modulated in response to the deviation signal when the rotational speed of the rotor is beyond the standard rotational speed.

5. The driving apparatus as defined in claim 1,
wherein the inverter control circuit comprises a plurality of switching devices for controlling application of a current to each of the coils by adjusting opening and closing of the switching devices.

6. The driving apparatus as defined in claim 1,
wherein the inverter control circuit comprises a driving circuit and an inverter circuit,
the driving circuit being adapted to processing the driving and braking signals transmitted to the controlling circuit and generating a signal adaptable to the inverter circuit.

7. A driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising:
a pole-position detector for detecting a position of a magnetic pole and outputting the detection signal,
a controlling circuit for generating a driving signal in response to the detection signal from the pole-position detector;
an inverter control circuit for controlling application of the current to each of the coils; and
a rotational speed sensor for sensing a rotational speed of the rotor;
wherein each coil has a first and a second ends, the first ends being connected mutually,
wherein the controlling circuit is adapted to generating a braking signal based on the rotational speed sensed by the rotational speed sensor and transmitting the driving and braking signals to the inverter control circuit, and
wherein the inverter control circuit comprises a first control section for electrically connecting each of the second ends of the coils to a positive power source and a second control section for electrically connecting each of the second ends of the coils to a negative power source,
the inverter control circuit being adapted to effecting the rotation control by a) electrically connecting a first coil selected from the coils to the positive power source through the first control section, b) electrically connecting a second coil selected from the coils to the negative power source through the second section and c) sequentially switching selection of the first and second coils, and the inverter control circuit further being adapted to effecting the braking control by electrically connecting a third coil selected from the coils not excited under the rotation control to the negative power source through the second control section so as to discharge part of the current flowing in the first coil by branching off through the third coil on condition of receiving a braking signal outputted on condition that the rotational speed of the rotor is beyond the predetermined speed.

8. The driving apparatus as defined in claim 7,
wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal in response to the deviation signal when the rotational speed of the rotor is beyond the standard rotational speed.

9. The driving apparatus as defined in claim 7,
wherein the rotational speed sensor is adapted to outputting detection signal pulses of a frequency corresponding to the rotational speed of the rotor, and
wherein the controlling circuit comprises a standard signal generator for generating standard clock pulses of a predetermined frequency for specifying a standard rotational speed of the rotor, a deviation determiner for comparing the standard clock pulses and the detection signal pulses so as to output a deviation signal based on one selected from a) the number of the standard clock pulses counted per one period of the detection signal pulse and b) the number of the detection signal pulses counted per one period of the standard clock pulse, and a braking signal generator for generating a braking signal based on the deviation signal.

10. The driving apparatus as defined in claim 7,
wherein the rotational speed sensor is adapted to outputting detection signal pulses of a frequency corresponding to the rotational speed of the rotor, and
wherein the controlling circuit comprises a standard signal generator for generating standard clock pulses of a predetermined frequency for specifying a standard rotational speed of the rotor, a deviation determiner for outputting a deviation signal by comparing the standard clock pulses and the detection signal pulses, and a braking signal generator for generating a braking signal based on the deviation signal,
wherein the deviation signal has an output level that depends on one selected from a) the number of the standard clock pulses counted per one period of the detection signal pulse and b) the number of the detection signal pulses counted per one period of the standard clock pulse, and
wherein the braking signal is outputted depending on the output level of the deviation signal.

11. The driving apparatus as defined in claim 7,
wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal that is pulse width modulated in response to the deviation signal when the rotational speed of the rotor is beyond the standard rotational speed.

12. The driving apparatus as defined in claim 7, wherein the inverter control circuit comprises a plurality of switching devices for controlling application of a current to each of the coils by adjusting opening and closing of the switching devices.

13. The driving apparatus as defined in claim 7, wherein the inverter control circuit comprises a driving circuit and an inverter circuit,
the driving circuit being adapted to processing the driving and braking signals transmitted to the controlling circuit and generating a signal adaptable to the inverter circuit.

14. A driving apparatus for driving a brushless motor having a rotor with a plurality of magnetic poles and a stator with a plurality of magnetic coils, by effecting a rotation control of the rotor by sequentially switching application of a current to each of the coils in response to a detection signal, comprising:
a pole-position detector for detecting a position of a magnetic pole and outputting the detection signal;
a controlling circuit for generating a driving signal in response to the detection signal from the pole-position detector; and
an inverter control circuit for controlling application of the current to each of the coils;
wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal in response to the deviation signal when the rotational speed of the rotor is beyond the standard rotational speed, and is adapted to transmitting both the driving and braking signals to the inverter control circuit, and
wherein the inverter control circuit is adapted to effecting the rotation control by sequentially switching application of the current to each of the coils upon reception of the driving signal and effecting the braking control by applying the current to at least one coil except those coils being excited under the rotation control upon reception of a braking signal generated on condition that the rotational speed is beyond a predetermined value.

15. The driving apparatus as defined in claim 14, wherein the rotational speed sensor is adapted to outputting detection signal pulses of a frequency corresponding to the rotational speed of the rotor, and
wherein the controlling circuit comprises a standard signal generator for generating standard clock pulses of a predetermined frequency for specifying a standard rotational speed of the rotor, a deviation determiner for comparing the standard clock pulses and the detection signal pulses so as to output a deviation signal based on one selected from a) the number of the standard clock pulses counted per one period of the detection signal pulse and b) the number of the detection signal pulses counted per one period of the standard clock pulse, and a braking signal generator for generating a braking signal based on the deviation signal.

16. The driving apparatus as defined in claim 14, wherein the rotational speed sensor is adapted to outputting detection signal pulses of a frequency corresponding to the rotational speed of the rotor, and
wherein the controlling circuit comprises a standard signal generator for generating standard clock pulses of a predetermined frequency for specifying a standard rotational speed of the rotor, a deviation determiner for outputting a deviation signal by comparing the standard clock pulses and the detection signal pulses, and a braking signal generator for generating a braking signal based on the deviation signal,
wherein the deviation signal has an output level that depends on one selected from a) the number of the standard clock pulses counted per one period of the detection signal pulse and b) the number of the detection signal pulses counted per one period of the standard clock pulse, and
wherein the braking signal is outputted depending on the output level of the deviation signal.

17. The driving apparatus as defined in claim 14, wherein the controlling circuit comprises a standard signal generator for generating a standard signal specifying a standard rotational speed of the rotor, a deviation determiner for outputting a deviation signal based on the standard signal and the detection signal, and a braking signal generator for generating a braking signal that is pulse width modulated in response to the deviation signal when the rotational speed of the rotor is beyond the standard rotational speed.

18. The driving apparatus as defined in claim 14, wherein the inverter control circuit comprises a plurality of switching devices for controlling application of current to each of the coils by adjusting opening and closing of the switching devices.

19. The driving apparatus as defined in claim 14, wherein the inverter control circuit comprises a driving circuit and an inverter circuit,
the driving circuit being adapted to processing the driving and braking signals transmitted to the controlling circuit and generating a signal adaptable to the inverter circuit.

* * * * *